US 11,410,684 B1

(12) United States Patent
Klimkov et al.

(10) Patent No.: US 11,410,684 B1
(45) Date of Patent: Aug. 9, 2022

(54) TEXT-TO-SPEECH (TTS) PROCESSING WITH TRANSFER OF VOCAL CHARACTERISTICS

(71) Applicant: Amazon Technologies, Inc., Seattle, WA (US)

(72) Inventors: Viacheslav Klimkov, Berlin (DE); Thomas Renaud Drugman, Carnieres (BE); Alexander Galkin, E. Brunswick, NJ (US); Srikanth Ronanki, Cambridge (GB)

(73) Assignee: Amazon Technologies, Inc., Seattle, WA (US)

( * ) Notice: Subject to any disclaimer, the term of this patent is extended or adjusted under 35 U.S.C. 154(b) by 175 days.

(21) Appl. No.: 16/430,894

(22) Filed: Jun. 4, 2019

(51) Int. Cl.
| | | |
|---|---|---|
| G10L 13/00 | (2006.01) | |
| G10L 25/78 | (2013.01) | |
| G10L 13/027 | (2013.01) | |
| G10L 15/16 | (2006.01) | |
| G10L 15/187 | (2013.01) | |
| G06F 16/38 | (2019.01) | |
| G06N 3/08 | (2006.01) | |
| G06N 20/20 | (2019.01) | |
| G06F 17/18 | (2006.01) | |
| G06N 3/04 | (2006.01) | |
| G10L 13/04 | (2013.01) | |
| G10L 13/033 | (2013.01) | |
| G10L 13/07 | (2013.01) | |

(52) U.S. Cl.
CPC .......... *G10L 25/78* (2013.01); *G06F 16/38* (2019.01); *G06F 17/18* (2013.01); *G06N 3/0454* (2013.01); *G06N 3/08* (2013.01); *G06N 20/20* (2019.01); *G10L 13/027* (2013.01); *G10L 15/16* (2013.01); *G10L 15/187* (2013.01); *G10L 13/033* (2013.01); *G10L 13/04* (2013.01); *G10L 13/07* (2013.01)

(58) Field of Classification Search
None
See application file for complete search history.

(56) References Cited

U.S. PATENT DOCUMENTS

| | | | | |
|---|---|---|---|---|
| 7,505,950 | B2 * | 3/2009 | Tian | G10L 13/033 704/208 |
| 8,010,362 | B2 * | 8/2011 | Tamura | G10L 21/00 704/265 |
| 9,183,830 | B2 * | 11/2015 | Agiomyrgiannakis | G10L 13/02 |
| 9,972,300 | B2 * | 5/2018 | Raghavendra | G10L 13/08 |
| 10,186,251 | B1 * | 1/2019 | Mohammadi | G10L 13/0335 |
| 10,249,289 | B2 * | 4/2019 | Chun | G10L 13/08 |
| 2007/0208566 | A1 * | 9/2007 | En-Najjary | G10L 21/00 704/269 |
| 2019/0130894 | A1 * | 5/2019 | Jin | G10L 13/08 |

(Continued)

*Primary Examiner* — Richard Z Zhu
(74) *Attorney, Agent, or Firm* — Pierce Atwood LLP

(57) ABSTRACT

Audio data from a first, source speaker is received and processed to determine linguistic units and vocal characteristics corresponding to those linguistic units. The linguistic units may either be determined from received text data or may be determined from the audio data using automatic speech recognition. A model is trained using training data from a second, target speaker. The trained model concatenates the linguistic units with the vocal characteristics to produce output speech that has the "voice" of the target speaker and the vocal characteristics of the source speaker.

20 Claims, 16 Drawing Sheets

(56) References Cited

U.S. PATENT DOCUMENTS

2020/0380949 A1\* 12/2020 Wu ........................ G06N 5/046
2020/0410976 A1\* 12/2020 Zhou ....................... G10L 25/30
2021/0020161 A1\* 1/2021 Gao ........................ G10L 13/04

\* cited by examiner

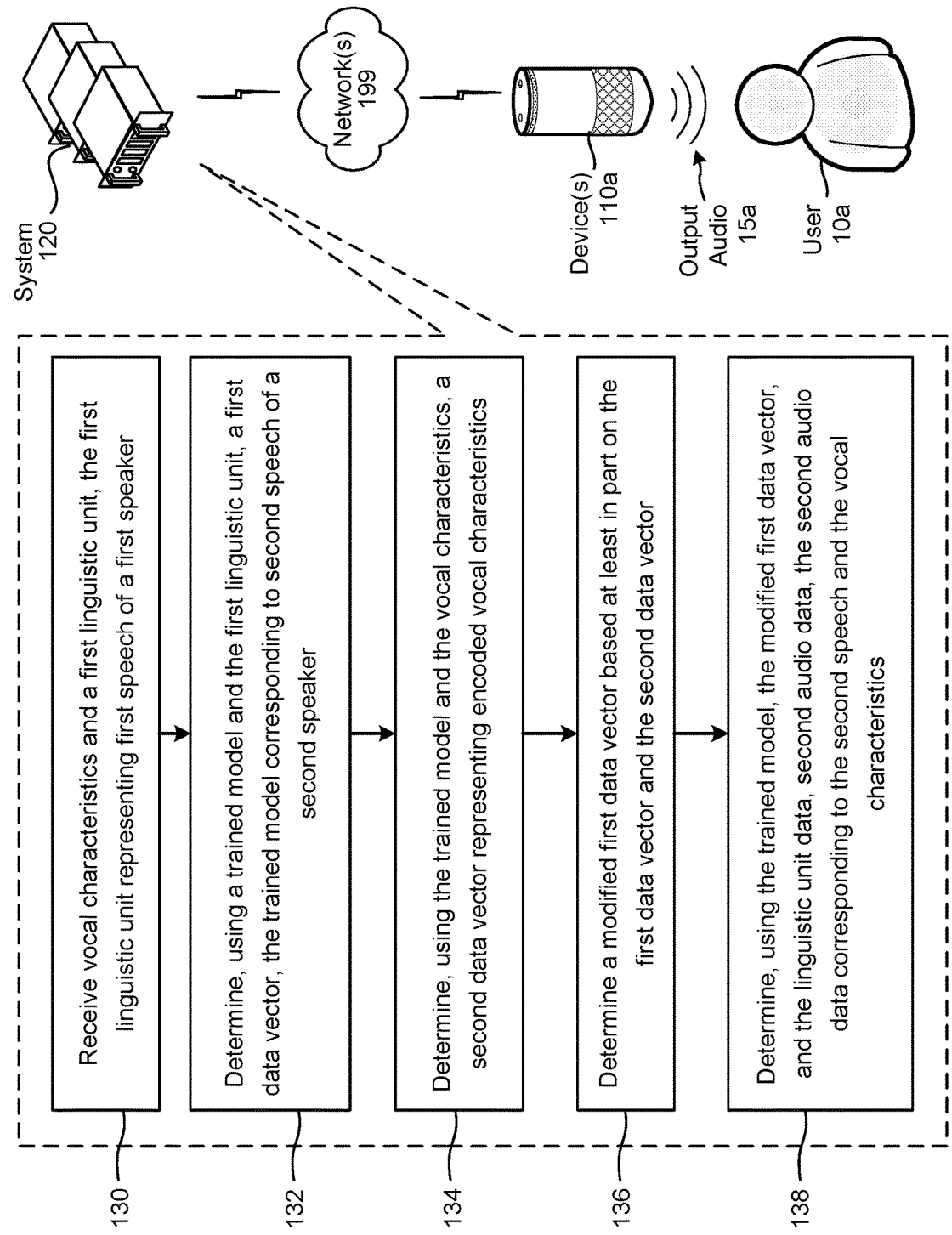

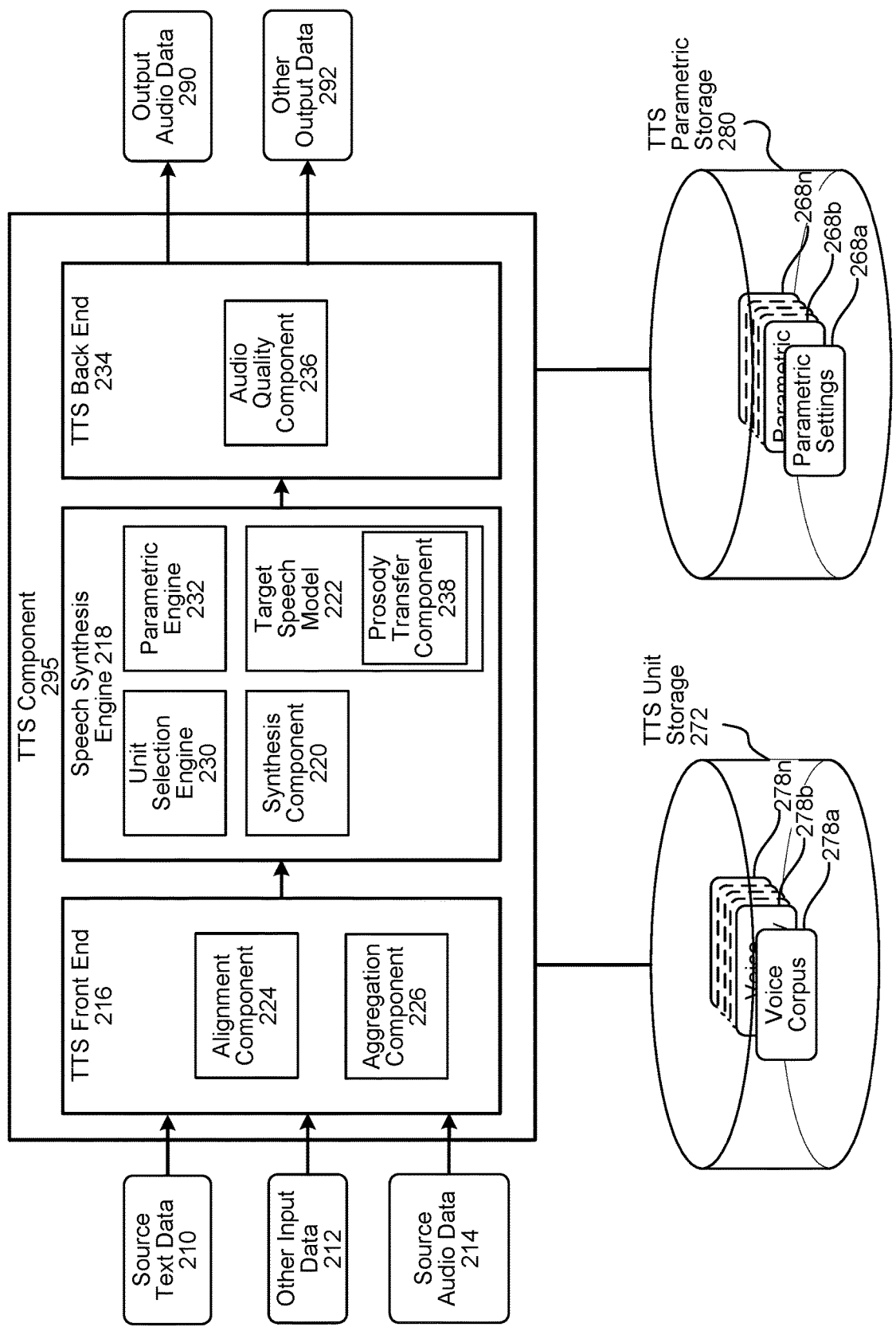

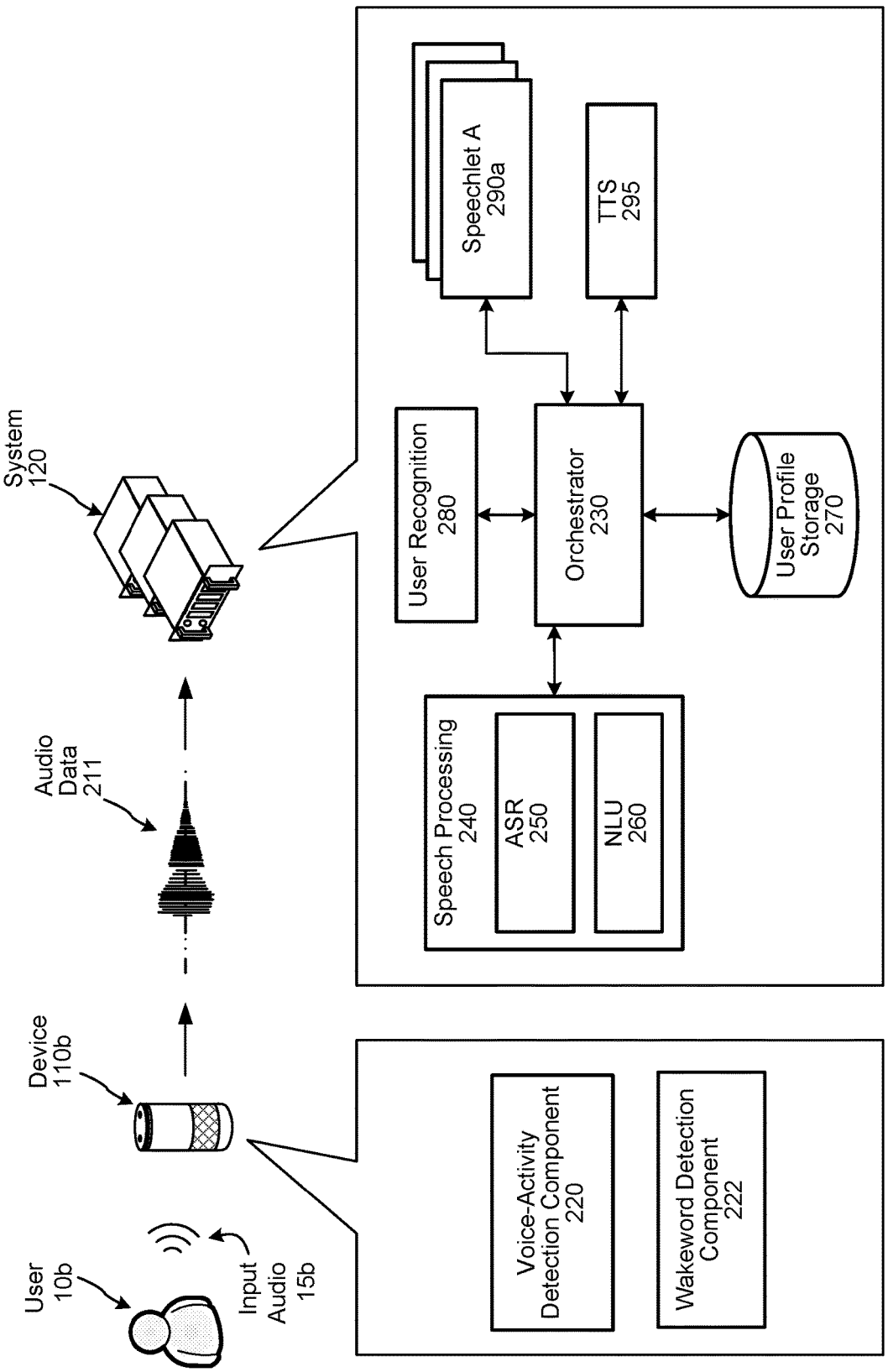

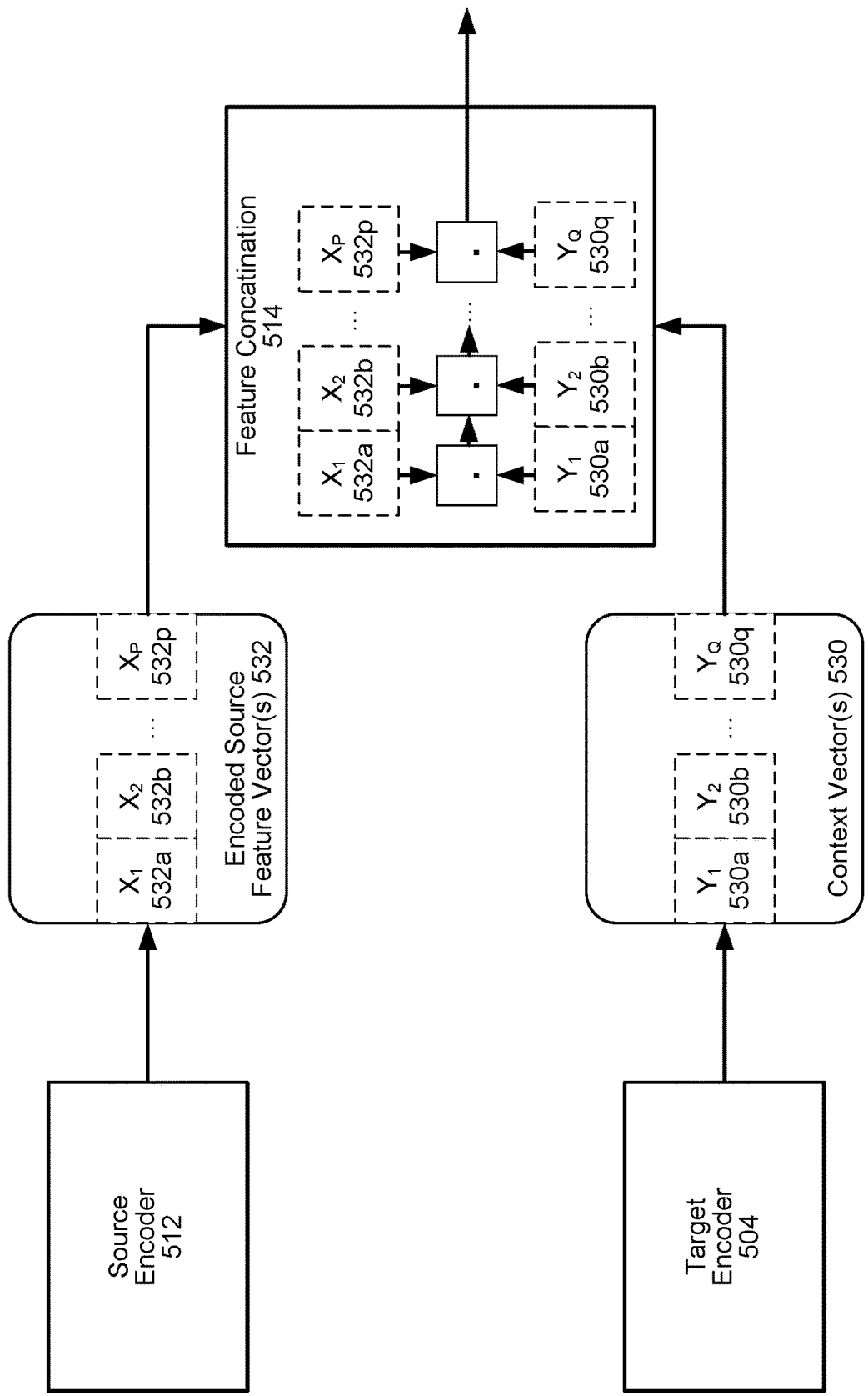

TEXT-TO-SPEECH (TTS) PROCESSING WITH TRANSFER OF VOCAL CHARACTERISTICS

BACKGROUND

Text-to-speech (TTS) systems convert text representing words into sound representing synthetic speech corresponding to the words. This conversion may be useful to assist users of digital devices by, for example, a voice user interface, in which humans interact with and control computing devices using their voice. TTS and speech-recognition systems, combined with natural language understanding processing techniques, enable speech-based user control and output of a computing device to perform tasks based on the user's spoken commands. The combination of speech recognition and natural-language understanding processing is referred to herein as speech processing. TTS and speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 illustrates an exemplary system overview according to embodiments of the present disclosure.

FIG. 2A illustrates components for performing text-to-speech (TTS) processing according to embodiments of the present disclosure.

FIGS. 2B and 2C illustrate components of a speech processing system according to embodiments of the present disclosure.

FIGS. 5A and 5B illustrate systems for transferring vocal characteristics according to embodiments of the present disclosure.

DETAILED DESCRIPTION

Figure 2C:
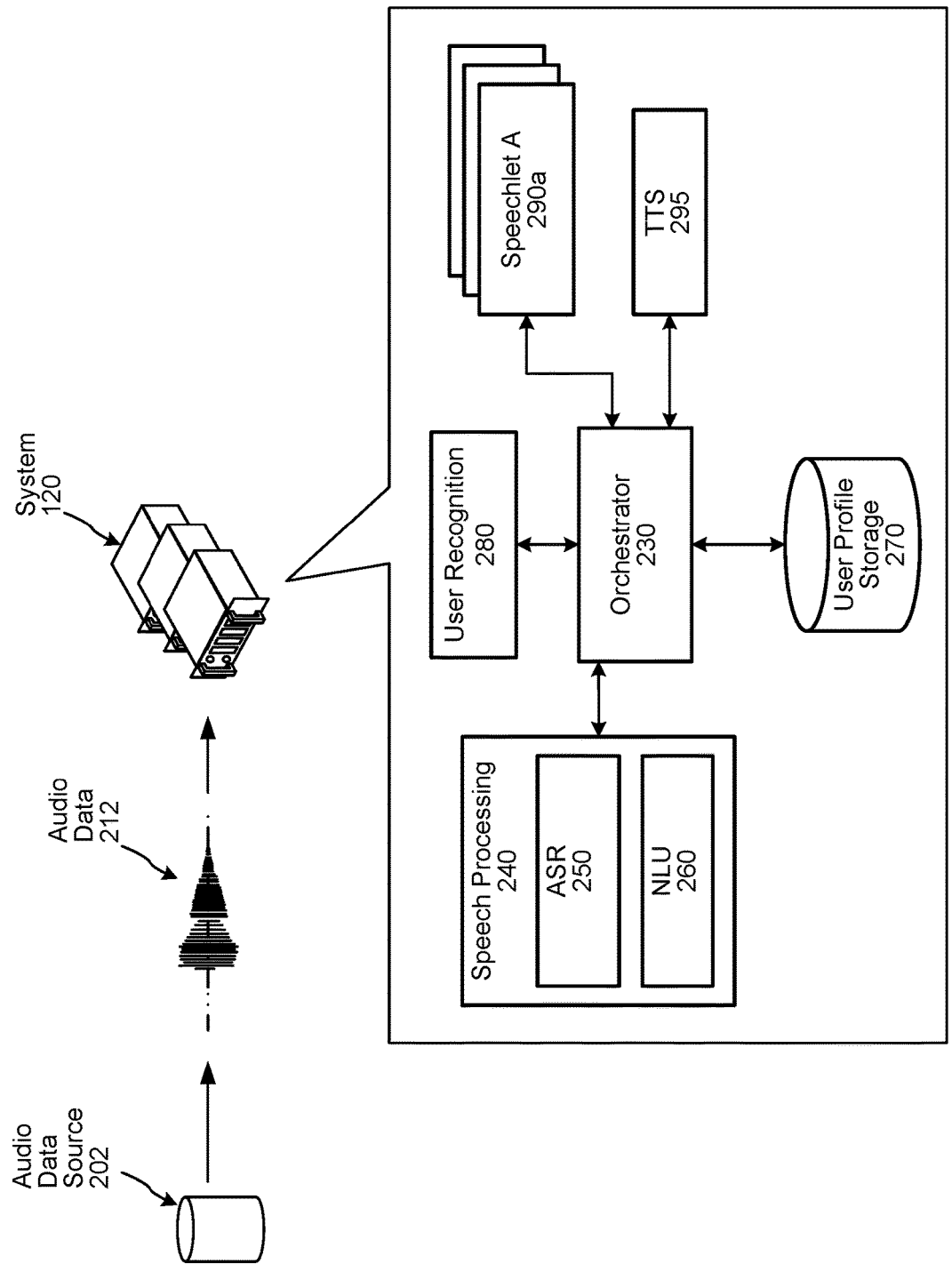

Text-to-speech (TTS) systems may be used to convert a representation of text into audio data that includes synthesized speech corresponding to the text. The output synthesized speech, like human speech, may have a number of characteristics. These characteristics may be divided into two categories: a first category of low-level characteristics such as consonant and vowel sounds, referred to herein as the "voice" of the synthesized speech, and a second category of high-level vocal characteristics such as intonation, tone, stress, cadence, and pitch, referred to herein as the "vocal characteristics" of the synthesized speech. In other words, the "voice" of human speech may be determined by physical characteristics of the human speaker, such as mouth size, vocal cord size, etc., while the "vocal characteristics" of the human speech may be determined by other characteristics of the human speaker, such as accent, emotional state, learned speech style, etc. Synthesized speech similarly has voice and vocal characteristics.

TTS systems may employ a technique called "unit selection" or "concatenative TTS" to process pre-recorded speech into many different segments of audio data, which may be referred to as linguistic units. The pre-recorded speech may be obtained by recording a human speaking. Each segment that the speech is divided into may correspond to a particular linguistic unit such as a phone, phoneme, diphone, triphone, or senon. The individual linguistic units and data describing the units may be stored in a unit database, which may also be called a voice corpus. When text data is received for TTS processing, the system may select linguistic units that correspond to the text data and may combine them to generate audio data that represents synthesized speech of the words in the text data.

TTS systems may further employ a second technique, called parametric synthesis, which may use computer models and other data processing techniques to generate sound that is not based on pre-recorded speech (e.g., speech recorded prior to receipt of an incoming TTS request), but rather uses computing parameters to create output audio data. Vocoders are examples of components that can produce synthesized speech using parametric synthesis. Parametric synthesis may provide a large range of diverse sounds that may be computer-generated at runtime for TTS processing.

Unit selection, however, may require many hours of recorded speech to create a sufficient voice corpus for unit selection. Further, in order to have output synthesized speech with desired audio qualities, the human speaker used to record the speech may be required to speak using a desired audio quality, which may be time consuming. For example, if the system is to be configured to be able to synthesize whispered speech using unit selection, a human user may need to read text in a whisper for hours to record enough sample speech to create a unit selection voice corpus that can be used to synthesized whispered speech. The same is true for synthesized speech with other qualities such as stern speech, excited speech, happy speech, etc. Thus, a typical voice corpus includes only neutral-sounding speech that does not include extreme emotive or other non-standard audio characteristics. Further, a particular voice corpus may be recorded by a particular voice performer fitting a certain voice profile and with a certain accent, e.g., Australian English, Japanese, etc. Configuring individual voice inventories for many combinations of language, voice profiles, audio qualities, etc., may be prohibitive.

In some embodiments, a neural-network model may be trained to directly generate audio output waveforms from source text sample-by-sample. The model may be trained to generate audio output that resembles the vocal characteristics of a particular speaker using training data from one or more human speakers. The model may create tens of thousands of samples per second of audio; in some embodiments, the rate of output audio samples is 16 kilohertz (kHz). The model may be fully probabilistic and/or autoregressive; that is, the predictive distribution of each audio sample may be conditioned on one or more previous audio samples. The model may use causal convolutions to predict output audio; in some embodiments, the model uses dilated convolutions to generate an output sample using a greater area of input samples than would otherwise be possible. The model may be trained using a conditioning network that conditions hidden layers of the network using linguistic context features, such as phoneme data. The audio output generated by the model may have higher audio quality than either unit selection or parametric synthesis.

Training the neural-network model so that it produces high-quality synthesized speech may, however, be time-consuming and/or expensive. A professional performer may be required to record 10-40 hours of specialized speech in order to provide adequate training data to the model. Once trained, the neural-network model is restricted to synthesized speech that resembles both the voice and vocal characteristics of the performer. A user of a TTS system may, however, wish to listen to synthesized speech having different vocal characteristics from that of the performer. Models having different vocal characteristics may be trained and used, but unless the training data is similarly produced by other professional performers, the synthesized speech output of the models may have lower quality. Further, a user of a TTS system may wish to output audio using the trained model and different vocal characteristics in real time; that is, the user may wish to speak and then have output audio determined that uses the voice of the performer but different vocal characteristics.

The present disclosure recites systems and methods for transferring vocal characteristics from first speech of a first speaker—e.g., audio for an audiobook as read by a person (and/or produced using unit speech synthesis and/or a vocoder), sung music, and/or live speech or live sung music, herein referred to as "source" speech data—to a neural-network model trained using second speech from a second speaker—e.g., a professional performer—and herein referred to as "target" speech data. In other words, instead of using the trained model to generate synthesized speech that has both the voice and vocal characteristics of the performer, the generated synthesized speech has the vocal characteristics of another person (the source) while retaining the voice of the performer (the target).

The source speech may be processed to determine a plurality of linguistic units representing the speech; alternatively, text corresponding to the source speech may already be known (in the case of, e.g., an audiobook). Audio data representing the source speech may then be processed to identify a begin time and an end time associated with each linguistic unit in a process called "alignment." For each linguistic unit, one or more vocal characteristics in the audio data are determined and aggregated. The source aggregated feature data is then used to modify audio data produced using the original text and a target model trained using the target speech data. A decoder may output a spectrogram corresponding to the input text data; the spectrogram may be a representation of frequencies of sound (e.g., a representation of synthesized speech) corresponding to the text data, which may vary in accordance with the vocal characteristics of the output speech. A model may use the spectrogram data, in addition to the input text data, to synthesize speech.

An exemplary system overview is described in reference to FIG. 1. As shown in FIG. 1, one or more system(s) 120 are connected over a network 199 to one or more device(s) 110a that are local to a user 10a. The system 120 may be one physical machine capable of performing various operations described herein or may include several different machines, such as in a distributed computing environment, that combine to perform the operations described herein. The system 120 and/or device 110a may produce output audio 15a in accordance with the embodiments described herein. The system 120 receives (130) a plurality of vocal characteristics corresponding to first audio data, the first audio data representing first speech of a first speaker. The system 120 determines (132), using a trained model and linguistic unit data corresponding to the first audio data, a first data vector representing a context of the text data, the trained model corresponding to second speech of a first speaker. The system 120 determines (134), using the trained model and the plurality of vocal characteristics, a second data vector representing encoded vocal characteristics. The system 120 determines (136) a modified first data vector based at least in part on the first data vector and the second data vector. The system 120 determines (138), using the trained model, the modified first data vector, and the linguistic unit data, second audio data, the second audio data corresponding to the second speech and the plurality of vocal characteristics.

Components of a system that may be used to perform unit selection, parametric TTS processing, and/or model-based audio synthesis are shown in FIG. 2. In various embodiments of the present invention, model-based synthesis of audio data may be performed using a TTS front-end 216, a speech synthesis engine 218, and a TTS back-end 234. The TTS front-end 216 may, as described in greater detail below, include an alignment component 224 and an aggregation component 226. In some embodiments, the TTS front end 216 further includes an acoustic model for generating acoustic data, such as phonemes, from source text data 210.

As shown in FIG. 2, the TTS component 295 may include the TTS front end 216, a speech synthesis engine 218, TTS unit storage 272, TTS parametric storage 280, and/or a TTS back end 234. The TTS unit storage 272 may include, among other things, voice corpuses 278a-288n that may include pre-recorded audio segments (called units) to be used by the unit selection engine 230 when performing unit selection synthesis as described below. The TTS parametric storage 280 may include, among other things, parametric settings 268a-268n that may be used by the parametric synthesis engine 232 when performing parametric synthesis as described below. A particular set of parametric settings 268 may correspond to a particular voice profile (e.g., whispered speech, excited speech, etc.). The target speech model 222 may be used to synthesize speech using source audio data 214, as described in greater detail below.

The TTS front end 216 transforms source text data 210 (from, for example, an application, user, device, or other text source) into a symbolic linguistic representation, which may include linguistic context features such as phoneme data, punctuation data, syllable-level features, word-level features, and/or emotion, speaker, accent, or other features for processing by the speech synthesis engine 218. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the source text data 210, such as surprise, anger, or fear. The speaker features may include data corresponding to a type of speaker, such as sex, age, or profession. The accent features may include data corresponding to an accent associated with the speaker, such as Southern, Boston, English, French, or other such accent.

The TTS front end 216 may further receive source audio data 214, which may be audio representing speech of a source speaker, sung music from a music source, or other audio data, and may correspond to the source text data 210. The source audio data 214 may be prerecorded audio, such as from an audiobook, or real-time audio from a speaker or music source. In some embodiments, the TTS front end 216 may process the source audio data 214 to determine the text data 210 or may send the audio to another system, such as a speech-processing system, to determine the text data 210. As described in greater detail below, the TTS front end 216 may determine linguistic unit data corresponding to the source audio data 214 using, for example, an acoustic model. An alignment component 224 may align the linguistic units with corresponding portions of the source audio data 214, and an aggregation component 226 may aggregate vocal characteristics corresponding to the source audio data 214, as described in greater detail below. The aggregated source feature data, which represents vocal characteristic data corresponding to the source audio data, and the source text data 210 may be used by the target speech model 222, which may include a vocal characteristics transfer component 238, to transfer vocal characteristics from a source speaker to a target speaker, as described in greater detail below.

The TTS front end 216 may also process other input data 212, such as text tags or text metadata, that may indicate, for example, how specific words should be pronounced, for example by indicating the desired output synthesized speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the source text data 210 and/or the text for a TTS request may be accompanied by separate metadata indicating what text should be whispered (or have some other indicated audio characteristic). The speech synthesis engine 218 may compare the annotated phonetic units models and information stored in the TTS unit storage 272 and/or TTS parametric storage 280 for converting the input text into synthesized speech. The TTS front end 216 and speech synthesis engine 218 may include their own controller(s)/processor(s) and memory or they may use the controller/processor and memory of the server 120, device 110, or other device, for example. Similarly, the instructions for operating the TTS front end 216 and speech synthesis engine 218 may be located within the TTS component 295, within the memory and/or storage of the server 120, device 110, or within an external device.

The TTS front end 216 may further include components for performing text normalization, linguistic analysis, or other such components. During text normalization, the TTS front end 216 may first process the text input and generate standard text, converting such things as numbers, abbreviations (such as Apt., St., etc.), symbols ($, %, etc.) into the equivalent of written out words.

During linguistic analysis, the TTS front end 216 may analyze the language in the normalized text to generate a sequence of linguistic units corresponding to the input text. This process may be referred to as grapheme-to-phoneme conversion. Linguistic units may include symbolic representations of sound units to be eventually combined and output by the system as synthesized speech. Various sound units may be used for dividing text for purposes of speech synthesis. The TTS component 295 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS storage component 272. The linguistic analysis performed by the TTS front end 216 may also identify different grammatical components such as prefixes, suffixes, phrases, punctuation, syntactic boundaries, or the like. Such grammatical components may be used by the TTS component 295 to craft a natural-sounding audio waveform output. The language dictionary may also include letter-to-sound rules and other tools that may be used to pronounce previously unidentified words or letter combinations that may be encountered by the TTS component 295. Generally, the more information included in the language dictionary, the higher quality the synthesized speech output.

Based on the linguistic analysis, the TTS front end 216 may then perform vocal characteristics generation where the linguistic units are annotated with desired vocal characteristics, which indicate how the desired linguistic units are to be pronounced in the eventual output synthesized speech. During this stage, the TTS front end 216 may consider and incorporate any annotations that accompanied the text input to the TTS component 295. Such annotations may correspond to syllable-level features, word-level features, emotion, speaker, accent, language, pitch, energy, duration, and the like. Application of acoustic features may be based on prosodic models available to the TTS component 295. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTS front end 216, which may be referred to as a symbolic linguistic representation, may include a sequence of linguistic units annotated with vocal characteristics. This symbolic linguistic representation may be sent to the speech synthesis engine 218, which may also be known as a synthesizer, for conversion into an audio waveform of synthesized speech for output to an audio output device and eventually to a user. The speech synthesis engine 218 may be configured to convert the input text into high-quality natural-sounding speech in an efficient manner. Such high-quality synthesized speech may be configured to sound as much like a human speaker as possible, or may be configured to be understandable to a listener without attempts to mimic a precise human voice.

The speech synthesis engine 218 may, as described in greater detail below, perform speech synthesis using a target speech model 222 and the aggregated source vocal characteristics. The target speech model 222 may be a sequence-to-sequence model and may be trained using training data produced by a professional performer; the target speech model is discussed in greater detail below with respect to FIGS. 3A and 3B. As also described in greater detail below, the target speech model 222 may use aggregated source vocal characteristics to modify the output of the target speech model 222 to incorporate vocal characteristics of a source speaker.

In another method of synthesis called unit selection, as described above, a unit selection engine 230 matches the symbolic linguistic representation created by the TTS front end 216 against a database of recorded speech, such as a database (e.g., TTS unit storage 272) storing information regarding one or more voice corpuses (e.g., voice inventories 278*a-n*). Each voice corpus may correspond to various segments of audio that was recorded by a speaking human where the segments are stored in a corpus 278 as linguistic units. Each stored unit of audio may also be associated with an index listing various acoustic properties or other descriptive information about the unit. Each unit includes an audio waveform corresponding with a phonetic unit, such as a short .wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 230 may then use the information about each unit to select units to be joined together to form the synthesized speech output.

The unit selection engine 230 matches the symbolic linguistic representation against information about the spoken audio units in the database. The unit database may include multiple examples of phonetic units to provide the system with many different options for concatenating units into synthesized speech. Matching units which are determined to have the desired acoustic qualities to create the desired output audio are selected and concatenated together (for example by a synthesis component 220) to form output audio data 290 representing synthesized speech. Using all the information in the unit database, a unit selection engine 230 may match units to the input text to select units that can form a natural sounding waveform. One benefit of unit selection is that, depending on the size of the database, a natural sounding synthesized speech output may be generated. As described above, the larger the unit database of the voice corpus, the more likely the system will be able to construct natural sounding synthesized speech.

In another method of synthesis called parametric synthesis, parameters such as frequency, volume, noise, are varied by a parametric synthesis engine 232, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output synthesized speech parameters. Using parametric synthesis, a computing system (for example, a synthesis component 220) can generate audio waveforms having the desired acoustic properties. Parametric synthesis may include the ability to be accurate at high processing speeds, as well as the ability to process speech without large databases associated with unit selection, but also may produce an output synthesized speech quality that may not match that of unit selection. Unit selection and parametric techniques may be performed individually or combined together and/or combined with other synthesis techniques to produce synthesized speech audio output.

The TTS component 295 may be configured to perform TTS processing in multiple languages. For each language, the TTS component 295 may include specially configured data, instructions, and/or components to synthesize speech in the desired language(s). To improve performance, the TTS component 295 may revise/update the contents of the TTS storage 280 based on feedback of the results of TTS processing, thus enabling the TTS component 295 to improve speech recognition.

The TTS storage component 295 may be customized for an individual user based on his/her individualized desired synthesized speech output. In particular, the speech unit stored in a unit database may be taken from input audio data of the user speaking. For example, to create the customized synthesized speech output of the system, the system may be configured with multiple voice corpuses 278*a*-278*n*, where each unit database is configured with a different "voice" to match desired speech qualities. Such voice corpuses may also be linked to user accounts. In one example, one voice corpus may be stored to be used to synthesize whispered speech (or synthesized speech approximating whispered speech), another may be stored to be used to synthesize excited speech (or synthesized speech approximating excited speech), and so on. To create the different voice corpuses, a multitude of TTS training utterances may be spoken by an individual and recorded by the system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired synthesized speech quality. The customized voice corpus 278 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting synthesized speech. Many other examples are possible. The desired parametric features for particular speech qualities may be stored in a voice profile (e.g., parametric settings 268) and used for speech synthesis when the specific speech quality is desired. Customized voices may be created based on multiple desired speech qualities combined (for either unit selection or parametric synthesis). For example, one voice may be "shouted" while another voice may be "shouted and emphasized." Many such combinations are possible.

Unit selection speech synthesis may be performed using a two-step process. First, the unit selection engine 230 determines what speech units to use and then it combines them so that the particular combined units match the desired phonemes and acoustic features and create the desired synthesized speech output. Units may be selected based on a cost function which represents how well particular units fit the synthesized speech segments to be synthesized. The cost function may represent a combination of different costs representing different aspects of how well a particular speech unit may work for a particular speech segment. For example, a target cost indicates how well an individual given speech unit matches the features of a desired synthesized speech output (e.g., vocal characteristics). A join cost represents how well a particular speech unit matches an adjacent speech unit (e.g., a speech unit appearing directly before or directly after the particular speech unit) for purposes of concatenating the speech units together in the eventual synthesized speech. The overall cost function is a combination of target cost, join cost, and other costs that may be determined by the unit selection engine 230. As part of unit selection, the unit selection engine 230 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS unit storage 272 or in another storage component. For example, different unit selection databases may be stored in TTS unit storage 272. Each speech unit database (e.g., voice corpus) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by linguistic unit, linguistic characteristic label, acoustic feature sequence, speaker identity, etc. The sample utterances may be used to create mathematical models corresponding to desired audio output for particular speech units. When matching a symbolic linguistic representation, the speech synthesis engine 218 may attempt to select a unit in the speech unit database that most closely matches the input text (including both phonetic units and prosodic annotations). Generally, the larger the voice corpus/speech unit database, the better the speech synthesis may be achieved by virtue of the greater number of unit samples that may be selected to form the precise desired s synthesized peech output.

Vocoder-based parametric speech synthesis may be performed as follows. A TTS component 295 may include an acoustic model, or other models, which may convert a symbolic linguistic representation into a synthetic acoustic waveform of the text input based on audio signal manipulation. The acoustic model includes rules which may be used by the parametric synthesis engine 232 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTS front end 216.

The parametric synthesis engine 232 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder, and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 218, the state may change or stay the same, based on the processing of the new text. For example, the pronunciation of a previously processed word might change based on later processed words. A Viterbi algorithm may be used to find the most likely sequence of states based on the processed text. The HMMs may generate synthesized speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/stochastic model) vocoders, or others.

A sample input phonetic unit may be processed by the parametric synthesis engine 232. The parametric synthesis engine 232 may initially assign a probability that the proper audio output associated with that phoneme is represented by state $S_0$ in a Hidden Markov Model (HMM). After further processing, the speech synthesis engine 218 determines whether the state should either remain the same, or change to a new state. For example, whether the state should remain the same may depend on the corresponding transition probability (written as $P(S_0|S_0)$, meaning the probability of remaining in state $S_0$) and how well the subsequent frame matches states $S_0$ and $S_1$. If state $S_1$ is the most probable, the calculations move to state $S_1$ and continue from there. For subsequent phonetic units, the speech synthesis engine 218 similarly determines whether the state should remain at $S_1$, using the transition probability represented by $P(S_1|S_1)$, or move to the next state, using the transition probability $P(S_2|S_1)$. As the processing continues, the parametric synthesis engine 232 continues calculating such probabilities including the probability of remaining in state $S_2$ or the probability of moving from a state of illustrated phoneme/ E/to a state of another phoneme. After processing the phonetic units and acoustic features for state $S_2$, the speech recognition may move to the next phonetic unit in the input text.

The probabilities and states may be calculated using a number of techniques. For example, probabilities for each state may be calculated using a Gaussian model, Gaussian mixture model, or other technique based on the feature vectors and the contents of the TTS storage 280. Techniques such as maximum likelihood estimation (MLE) may be used to estimate the probability of particular states.

In addition to calculating potential states for one audio waveform as a potential match to a phonetic unit, the parametric synthesis engine 232 may also calculate potential states for other potential audio outputs (such as various ways of pronouncing a particular phoneme or diphone) as potential acoustic matches for the linguistic unit. In this manner multiple states and state transition probabilities may be calculated.

The probable states and probable state transitions calculated by the parametric synthesis engine 232 may lead to a number of potential audio output sequences. Based on the acoustic model and other potential models, the potential audio output sequences may be scored according to a confidence level of the parametric synthesis engine 232. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text. The different parametric settings 268, which may represent acoustic settings matching a particular parametric "voice", may be used by the synthesis component 220 to ultimately create the output audio data 290.

FIGS. 2B and 2C illustrate a speech processing system that includes the TTS system described above; in FIG. 2B, input audio is received from a user 10b, while in FIG. 2C, input audio is received from an audio data source 202 (e.g., computer storage that includes data representing the audio of an audiobook). Turning first to FIG. 2B, the device 110b may receive audio 15b using an audio capture component, such as a microphone or array of microphones. The device 110b may be a voice-controlled device, as illustrated; in other embodiments, the device 110b may be controlled using other inputs, such as a mouse, keyboard, or touchscreen.

If the device 110b is a voice-controlled device, it may include a voice activity detection (VAD) component 220 to determine whether speech is present in the audio data 15b based on various quantitative aspects of the first audio data, such as the spectral slope between one or more frames of the first audio data, the energy levels of the first audio data in one or more spectral bands the signal-to-noise ratios of the first audio data in one or more spectral bands; or other quantitative aspects. In other examples, the VAD component 220 may be a trained classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the first audio data to one or more acoustic models in speech storage, which acoustic models may include models corresponding to speech, noise (e.g., environmental noise or background noise), or silence.

If the VAD component 220 determines the audio data includes speech, a wakeword-detection component 222 may activate to process the audio data to determine if a wakeword is likely represented therein, and if so, send audio data 211 to the system 120. The wakeword-detection component 222 may process the audio data using trained models to detect a wakeword. The trained models may be acoustic models, hidden Markov models (HMMs), and or classifiers. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding may be used to search the best path in the decoding graph, and the decoding output is further processed to make the decision on wakeword presence. This approach can be extended to include discriminative information by incorporating a hybrid DNN-HMM decoding framework. Follow-on posterior threshold tuning or smoothing is applied for decision making.

After wakeword detection and upon receipt by the system 120, the audio data 211 may be sent to an orchestrator component 230. The orchestrator component 230 may include memory and logic that enables the orchestrator component 230 to transmit various pieces and forms of data to various components of the system.

The orchestrator component 230 may send the audio data 211 to a speech-processing component 240. An ASR component 250 of the speech processing component 240 may transcribe the audio data 211 into text data representing one more hypotheses representing speech contained in the audio data 211. The ASR component 250 may interpret the utterance in the audio data 211 based on a similarity between the utterance and pre-established language models. For example, the ASR component 250 may compare the audio data 211 with models for sounds (e.g., subword units, such as phonemes, etc.) and sequences of sounds to identify words that match the sequence of sounds spoken in the utterance represented in the audio data 211. The ASR component 250 may send the text data to the TTS component 295 for speech synthesis, as described in greater detail herein.

The ASR component 250 may, in some embodiments, send (either directly or via the orchestrator component 230) the text data to a corresponding selected NLU component 260 of the speech processing component 240. The NLU component 260 may be used to make a semantic interpretation of the phrases or statements represented in the text data input thereto. That is, the NLU component 260 may determine one or more meanings associated with the phrases or statements represented in the text data based on individual words represented in the text data.

One or more a speechlet components 290 may be used to determine output data based on the NLU results data. For example, if the NLU results data includes intent data corresponding to <PlayMusic> and tagged text corresponding to <Artist: Toto>, the orchestrator 230 (or other component of the system 120) may send the NLU results data to a music speechlet component, which determines Toto music audio data for output by the system. The system 120 may include a user-recognition component 280 for determining an identity of the user 10b and a user-profile storage 270 for storing data related to the user 10b. FIG. 2C is similar to FIG. 2B except the audio data 212 comes from an audio data source 202, such as an audiobook.

Figure 3A:
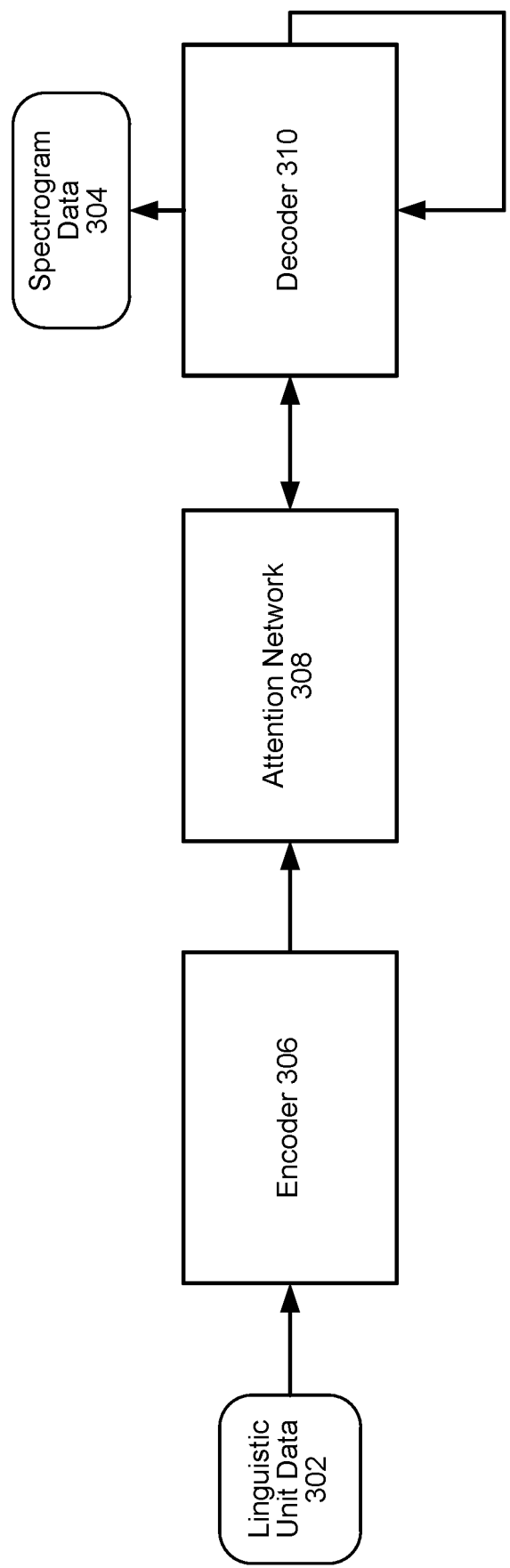
FIGS. 3A and 3B illustrate sequence-to-sequence neural-network TTS models according to embodiments of the present disclosure.
Figure 3B:
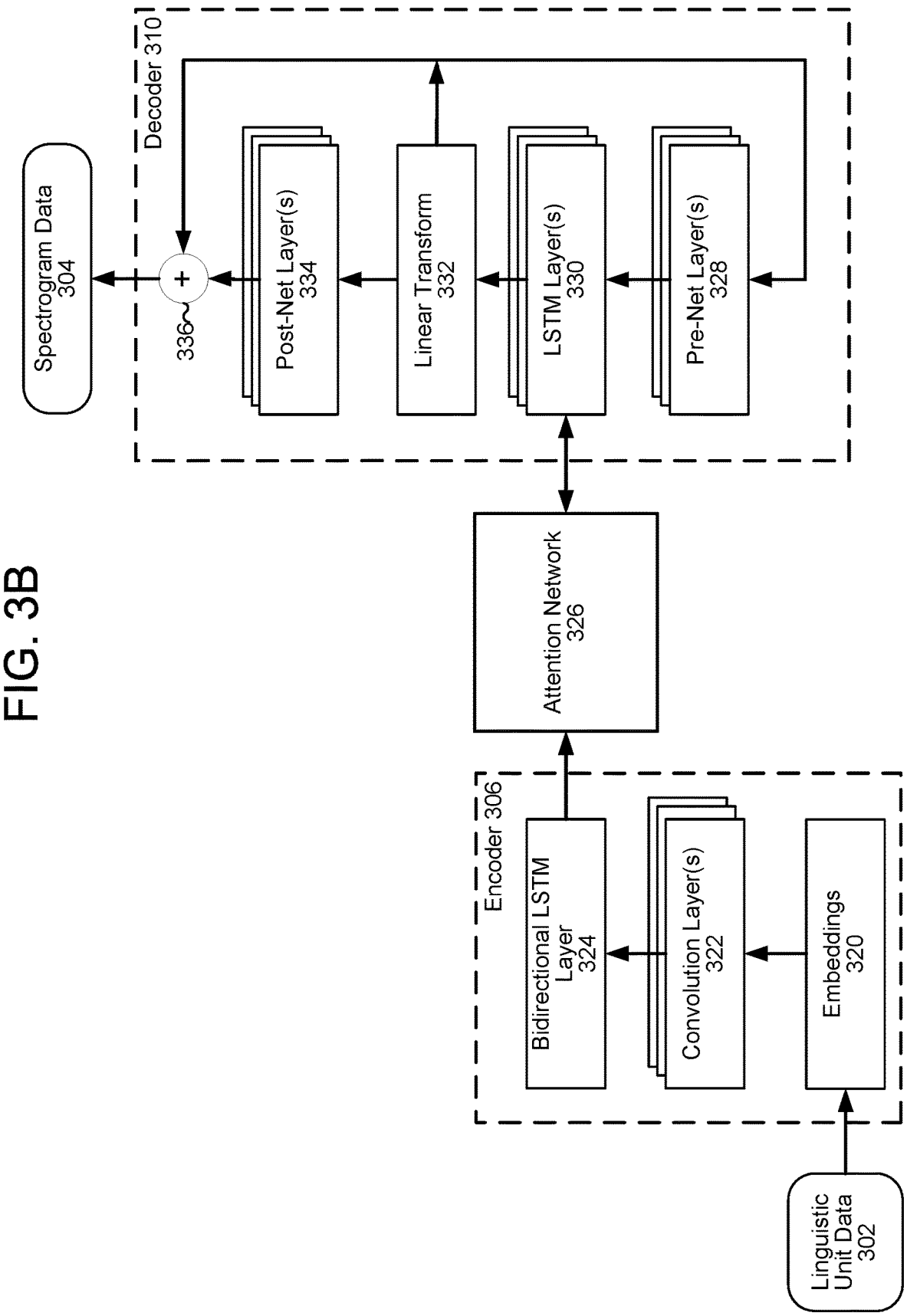

FIGS. 3A and 3B illustrate a speech model for synthesizing speech from text in accordance with embodiments of the present disclosure. As explained above, the TTS front end 216 may receive source text data 210, which may include text data such as ASCII text data, punctuation, tags, or other such data, and outputs corresponding linguistic unit data 302, which may include text characters, punctuation, phones, phonemes, syllable-level features, word-level features, and/or other features. The speech model outputs spectrogram data 304 that represents output synthesized speech; this spectrogram data 304 may be further processed to create output audio that includes the synthesized speech. The speech model may include an encoder 306, an attention network 308, and a decoder 310. This type of model may be referred to as a sequence-to-sequence or "seq2seq" model.

The encoder 306 may encode the linguistic unit data 302 into one or more data vectors, which may be context vectors. The decoder 310 may process the one or more context vectors and create corresponding spectrogram data 304. In various embodiments, the encoder 306 steps through input time steps and encodes the linguistic unit data 302 into a fixed-length vector of numbers called a context vector; the decoder 310 steps through output time steps while reading the context vector to create the spectrogram data 304. An attention mechanism 308 may be used to weight one or more outputs of one or more layers of the encoder 306 to emphasize or "attend" to one or more outputs versus the others in accordance with one or more weight factors.

Referring also to FIG. 3B, the encoder 306 may receive the linguistic unit data 302 (and/or source text data 210) and generate embeddings 320 based thereon. The embeddings 320 may represent the linguistic unit data 302 and/or source text data 210 as a defined list of characters, which may include, for example, English characters (e.g., a-z and A-Z), numbers, punctuation, special characters, and/or unknown characters. The embeddings 320 may transform the list of characters into one or more corresponding vectors using, for example, one-hot encoding. The vectors may be multi-dimensional; in some embodiments, the vectors represent a learned 512-dimensional character embedding.

The embeddings 320 may be processed by one or more convolution layer(s) 323, which may apply one or more convolution operations to the vectors corresponding to the embeddings 320. In some embodiments, the convolution layer(s) 322 correspond to three convolutional layers each containing 512 filters having shapes of 5×1, i.e., each filter spans five characters. The convolution layer(s) 322 may model longer-term context (e.g., N-grams) in the embeddings 320.

The final output of the convolution layer(s) 322 (i.e., the output of the only or final convolutional layer) may be passed to a bidirectional LSTM layer 324 to generate encodings corresponding to the linguistic unit data 302. In some embodiments, the bidirectional LSTM layer 324 includes 512 units: 256 in a first direction and 256 in a second direction.

In some embodiments, the speech model includes an attention network 326 that summarizes the full encoded sequence output by the bidirectional LSTM layer 324 as fixed-length context vectors corresponding to output step of the decoder 310. The attention network 326 may a RNN, DNN, or other network discussed herein, and may include nodes having weights and/or cost functions arranged into one or more layers. Attention probabilities may be computed after projecting inputs to, for example, 128-dimensional hidden representations. In some embodiments, the attention network 326 weights certain values of the context vector and/or outputs of other layers of the encoder 306 before sending them to the decoder 310. The attention network 326 may, for example, weight certain portions of the context vector and/or outputs of other layers of the encoder 306 by increasing their value and may weight other portions of the context vector and/or outputs of other layers of the encoder 306 by decreasing their value. The increased values may correspond to acoustic features to which more attention should be paid by the decoder 310 and the decreased values may correspond to acoustic feature to which less attention should be paid by the decoder 310.

Use of the attention network 326 may permit the encoder 306 to avoid encoding the full source linguistic unit data 302 into a fixed-length vector; instead, the attention network 326 may allow the decoder 310 to "attend" to different parts of the linguistic unit data 302 at each step of output generation. The attention network 326 may allow the encoder 306 and/or decoder 310 to learn what to attend to based on the linguistic unit data 302 and/or produced spectrogram data 304.

The decoder 310 may be a network, such as a neural network; in some embodiments, the decoder is an autoregressive recurrent neural network (RNN). The decoder 310 may generate the spectrogram data 304 from the encoded linguistic unit data 302 one frame at a time. The spectrogram data 304 may represent a prediction of frequencies corresponding to the output audio data 290. For example, if the output audio data 290 corresponds to synthesized speech denoting a fearful emotion, the spectrogram data 304 may include a prediction of higher frequencies; if the output audio data 290 corresponds to synthesized speech denoting a whisper, the spectrogram data 304 may include a prediction of lower frequencies. In some embodiments, the spectrogram data 304 includes frequencies adjusted in accordance with a Mel scale, in which the spectrogram data 304 corresponds to a perceptual scale of pitches judged by listeners to be equal in distance from one another. In these embodiments, the spectrogram data 304 may include or be referred to as a Mel-frequency spectrogram and/or a Mel-frequency cepstrum (MFC).

The decoder 310 may include one or more pre-net layers 328. The pre-net layers 328 may include two fully connected layers of 256 hidden units, such as rectified linear units (ReLUs). The pre-net layers 328 receive spectrogram data 304 from a previous time-step and may act as information bottleneck, thereby aiding the attention network 614 in focusing attention on particular outputs of the encoder 306. In some embodiments, use of the pre-net layer(s) 328 allows the decoder 310 to place a greater emphasis on the output of the attention network 326 and less emphasis on the spectrogram data 304 from the previous time-step.

The output of the pre-net layers 328 may be concatenated with the output of the attention network 326. One or more LSTM layer(s) 330 may receive this concatenated output. The LSTM layer(s) 330 may include two uni-directional LSTM layers, each having 1024 units. The output of the LSTM layer(s) 330 may be transformed with a linear transform 332, such as a linear projection. In other embodiments, a different transform, such as an affine transform, may be used. One or more post-net layer(s) 334, which may be convolution layers, may receive the output of the linear transform 332; in some embodiments, the post-net layer(s) 334 include five layers, and each layer includes 512 filters having shapes 5×1 with batch normalization; tan h activations may be performed on outputs of all but the final layer. A concatenation element 336 may concatenate the output of the post-net layer(s) 334 with the output of the linear transform 332 to generate the spectrogram data 304.

Figure 4:
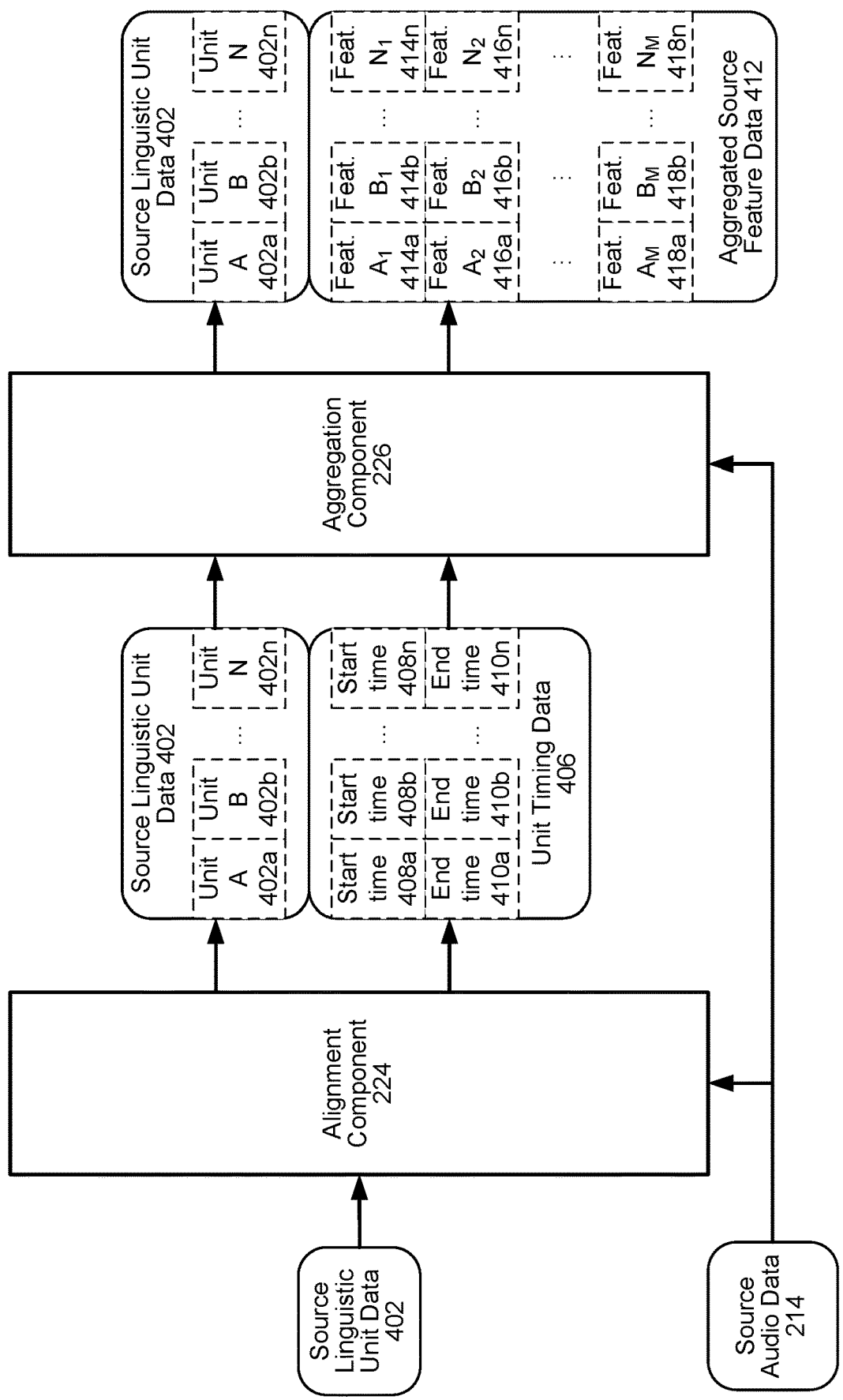
FIG. 4 illustrates a system for aggregating vocal characteristics according to embodiments of the present disclosure.

FIG. 4 illustrates how the front-end TTS component 216 may process the source audio data 214 using the alignment component 224 and the aggregation component 226. The alignment component 224 may receive source linguistic unit data 402 from, for example, an acoustic model of the TTS front end 216. The source linguistic unit data 402 may be a series of linguistic units that represent speech, sung music, or other audio in the source audio data 214. For example, the source linguistic unit data 402 may be a series of phonemes that represent speech. As an example, if the source audio data 214 includes a representation of the wakeword "Alexa," the source linguistic unit data 402 may include representations of the phonemes ""AX," "L," "EH," "K," "S," and "AX." The alignment component 224 further receives source audio data 502, which may digital data representing audio including speech, sung music, or other audio and/or spectrogram data representing features of the speech, sung music, or other audio. The alignment component 224 determines, for each source linguistic unit 402a . . . n, unit timing data 406 that includes a start time 408 and an end time 410 for each source linguistic unit 402. Each start time 408 may be a representation of a time at which the corresponding linguistic unit 402a . . . n begins in the source audio data 214, and each end time 410 may be a representation of a time at which the corresponding linguistic unit 402*a* . . . *n* ends in the source audio data 214.

In some embodiments, as described above, an ASR system generates text data that represents speech in the source audio data 214. In these embodiments, the alignment component 224 may receive, from the ASR system, timing data that represents how the text data and/or source linguistic unit data 402 corresponds to the source audio data 214. In other words, the ASR system may store timing data as it generates the text data and may transmit this timing data to the alignment component 224. Upon receipt of the timing data, the alignment component 224 may generate the unit timing data 406 by matching the timing data to the source linguistic unit data 402.

In other embodiments, the alignment component 224 determines the unit timing data 406 by dividing the source audio data 214 into progressively smaller portions in a process sometimes referred to as "chunking" or "segmenting." The alignment component 224 may, for example, process the source audio data 214 to determine periods of silence in the source audio data 214; these periods of silence may correspond to word boundaries in the source audio data 214. The alignment component 224 may then match the pattern of determined word boundaries in the source audio data 214 with word boundaries represented in the source linguistic unit data 402 to determine which linguistic units correspond to which words. The alignment component 224 may determine unit timing data 406 within words by matching features of the source audio data 214, such as pitch or power, with corresponding features of the source linguistic unit data 402. In other embodiments, the alignment component 224 includes a HMM that generates the unit timing data 406 using, for example, Viterbi decoding. The HMM may, for example, process the source audio data 214 to determine one or more acoustic features and then determine a likelihood that the determined acoustic features match those produced by an acoustic model. The HMM may then, if the likelihood is greater than a threshold, output the unit timing data 406 and/or data corresponding to the likelihood.

The aggregation component 226 receives the source linguistic units 402*a* . . . *n*, the unit timing data 406, and the source audio data 214 and outputs aggregated source feature data 412 representing vocal characteristics of the source audio data 214. The aggregated source feature data 412 includes, for each of N linguistic units 402*a* . . . *n* in the source linguistic unit data 402, M aggregated source features. The number N may represent a total number of linguistic units in the source linguistic unit data 402; this number N may correspond to an overall length of the source linguistic unit data 402. The number M may represent a number of acoustic features to be determined and aggregated for each linguistic unit 402; this number M may be, for example, 1-10 and, in some embodiments, 7. Thus, for a first linguistic unit 402*a*, the aggregation component 226 may determine, for a first linguistic unit 402*a*, M features $A_1$ 414*a*, $A_2$ 416*a*, . . . $A_M$ 418*a*; for a second linguistic unit 402*b*, M features $B_1$ 414*b*, $B_2$ 416*b*, $B_M$ 418*b*; and so on.

The present disclosure is not limited to any particular type or number of acoustic features in the aggregated source feature data 412. The acoustic features may be, however, fundamental frequency (F0), F0 contour, pitch, power, loudness, duration, intonation, mel-generalized cepstrum for loudness (mgc0), and/or mel-generalized cepstrum for spectral tilt (mgc1). The acoustic features may further include changes in the aforementioned features during the duration of the corresponding linguistic unit; these changes may be an amount of increase or decrease, a rate of increase or decrease, and/or a total amount of increase and decrease.

The aggregation component 226 may further determine multiple acoustic features for each linguistic unit. For example, each linguistic unit may be comprised of multiple "states"; each state may correspond to a different portion of the linguistic unit, such as its beginning, middle, and end. The size and position of each state may be determined based on dividing the duration of the linguistic unit by the number of states. In other embodiments, the size and position of each state may be determined based on probability distributions of a Gaussian mixture model (GMM) representing the linguistic unit. The number of states may be any number; in some embodiments, the number of states is 3-5 states.

The aggregation component 226 may, if the value of a feature varies across the linguistic unit, determine a value for each feature for each linguistic unit (or, as described above, for each state of each linguistic unit) by, for example, determining the mean or mode of the values. Some or all of the values may be weighted based on a likelihood that a given linguistic unit accurately represents a corresponding sound in the source audio data 214; this likelihood may be determined using, for example, the HMM of the alignment component 224. The values may also or instead weighted based on a level of loudness of the speech, in which louder speech is emphasized over quieter speech, or weight based on a presence or absence of background noise in the speech data 214, such as a second speaker. Each item of the aggregated source feature data 412 may be determined based solely on its corresponding source linguistic unit data 402 or may be determined based on a plurality of source linguistic units 402*a* . . . *n*, such as a number of source linguistic units surrounding the corresponding source linguistic unit 402*a* . . . *n*.

If the source audio data 214 is predetermined, the alignment component 224 may determine the unit timing data 406 in a first step and then, in a second, later step, the aggregation component 226 may determine the aggregated source feature data 412. If the source audio data 214 is not predetermined and comes from, for example, a live speaker, the aggregation component 226 may determine the aggregated source feature data 412 for each linguistic unit 402*a* . . . *n* as the alignment component 224 determines the unit timing data 406 for that unit 402*a* . . . *n*. The alignment component 224 and aggregation component 226 may operate in this fashion for predetermined audio data 214.

Figure 5A:
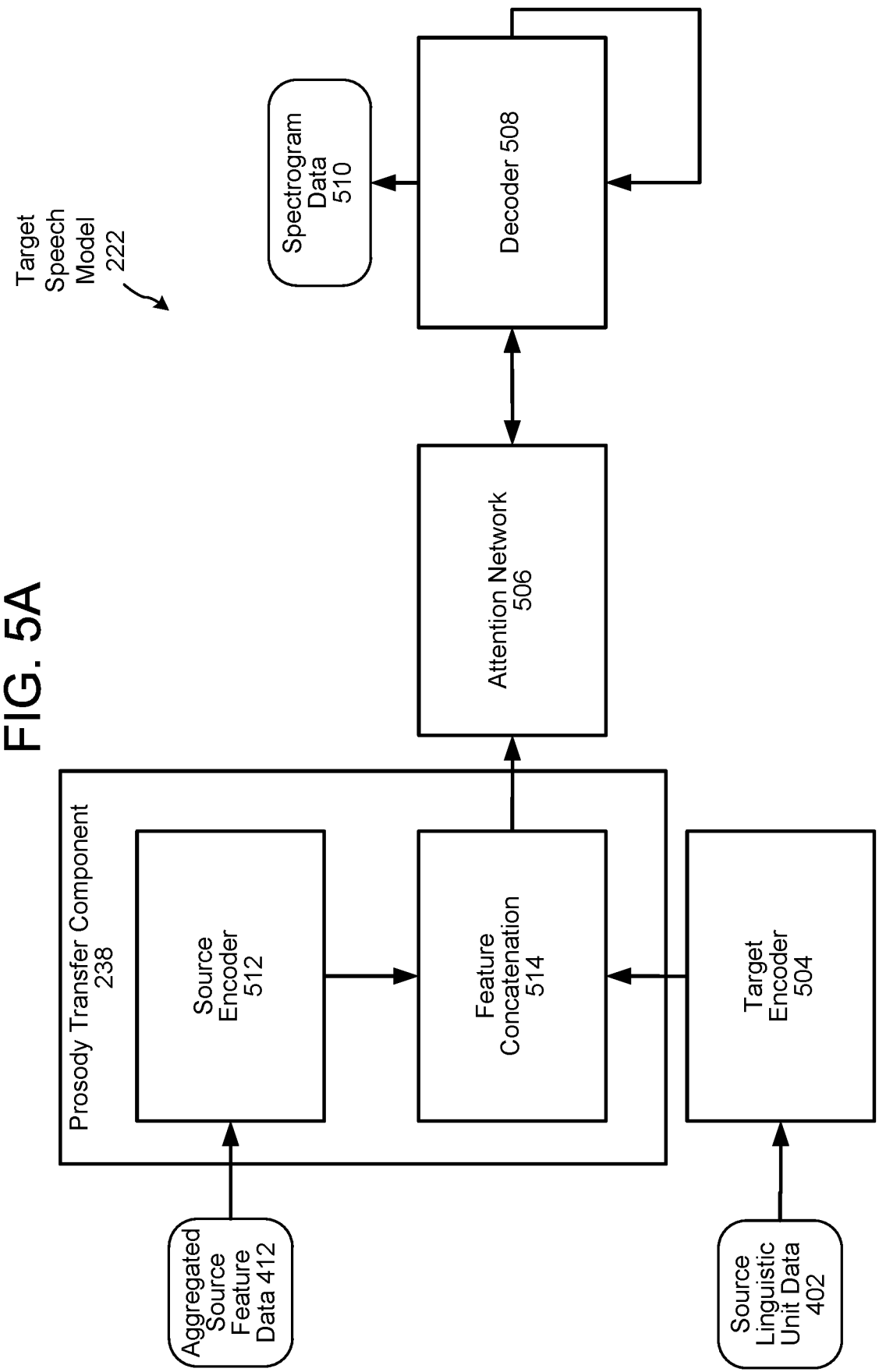
Figure 5C:
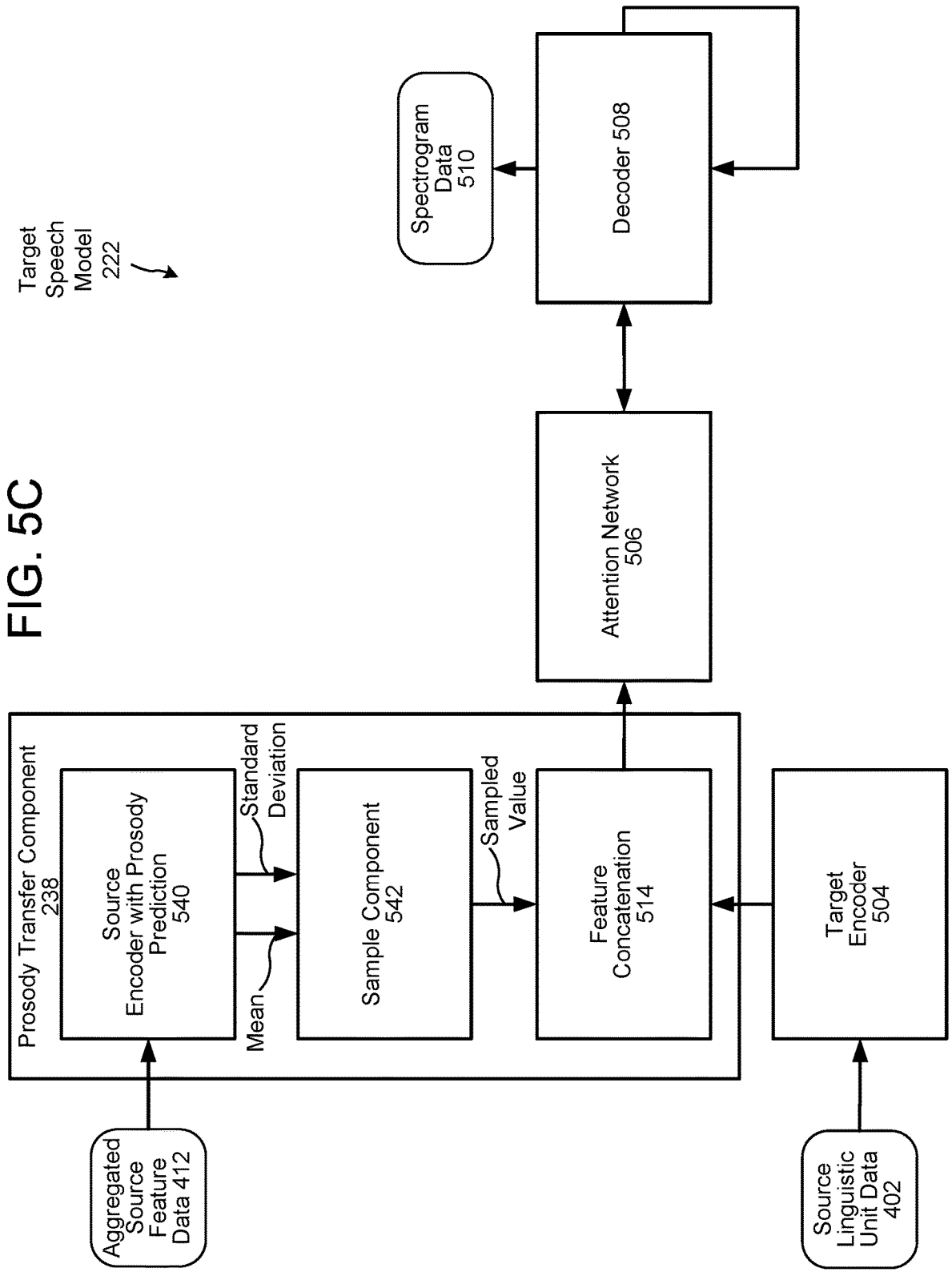
FIG. 5C illustrates a system for transferring vocal characteristics using feature sampling according to embodiments of the present disclosure.

FIGS. 5A, 5B, and 5C illustrate the vocal characteristics transfer component 238 of the target speech model 222 using the aggregated source feature data 412 to modify synthesized speech based on the source linguistic units 402*a* . . . *n*. As described above, the source linguistic unit data 402 represents a sequence of linguistic units, such as phonemes, that are predetermined and/or generated from audio data using, for example, an acoustic model. As also described above, the target encoder 504, attention network 506, and decoder 508 may be trained using high-quality training data from a professional performer.

The target encoder 504 may be or include components of the linguistic encoder 306 as described above with reference to FIG. 3A; the target encoder may include, for example, convolution layers 322 and/or LSTM layers 324. The target encoder 504 may thus process the source linguistic unit data 402 to determine a context vector that represents an intermediate form of the ultimate spectrogram data 510 output by the decoder 508. The context vector may, for example, represent higher-level features for each linguistic unit, such as emotion, speech rate, accent, or other such features. The context vector may further include values representing the same or similar features as discussed above with reference to the aggregated source feature data 412, such as pitch, power, or intonation.

A source encoder 512 receives the aggregated source feature data 412 and encodes it to create a data vector, which may be an encoded source feature vector. The source encoder 512 may include convolution 322 and/or LSTM layers 324 but may not be a linguistic encoder, such as the target encoder 504, and may simply convert aggregated source feature data 412 to a form that has a similar level of encoding as the context vector output by the target encoder 504. For example, if the target encoder 504 includes a convolution operation that convolves linguistic unit data corresponding to a time window of a certain size, the source encoder 512 may perform a convolution (or other time-dependent operation) over a time window of a similar size. Similarly, if the target encoder 504 has ten layers, the source encoder 512 may also have ten layers. The source encoder 512 may thus be or include a feature encoder for encoding the features in the aggregated source feature data 412.

A feature concatenation component 514 may receive the context vector output by the target encoder 504 and the encoded source feature vector and modify the context vector in accordance with the encoded source feature vector to generate a modified context vector; this modified context vector may then be processed by the attention mechanism 506 and decoder 508 to determine the spectrogram data 606. The decoder 508 may be or include components of the decoder 310, such as LSTM layers 330 and/or the linear transform component 332. The feature concatenation component 514 may generate the modified context vector by concatenating (e.g., adding) the values associated with the encoded source feature vector to the context vector. In some embodiments, values in the encoded source feature vector and the context vector representing similar features may be averaged. FIG. 5B illustrates an example of the context vectors 530 $Y_1 \ldots Y_Q$, the encoded source feature vectors 532 $X_1 \ldots X_P$, and the operation of the feature concatenation component 514. In various embodiments, Q=P; that is, for each audio frame, the target encoder generates a context vector 530 and the source encoder generates an encoded source feature vector 532. The feature concatenation component 514 may thus concatenate, for each frame, a context vector 530 and an encoded source feature vector 532 generated for that frame. In other embodiments, Q≠P; that is, either the source encoder 512 or the target encoder 504 does not generate an output for each frame. In these embodiments, an additional attention mechanism may be used to combine the context vector 530 and the encoded source feature vector 532.

FIG. 5C illustrates another embodiment of the vocal characteristics transfer component 238 of the target speech model 222 that includes a source encoder with vocal characteristics prediction 540, which may be referred to as a variational autoencoder (VAE), and a sample component 542. The source encoder 512 of FIG. 5A determines the values of the encoded source feature vector 532; the source encoder with vocal characteristics prediction 540, by contrast, determines a probability distribution of values for each of the values of the encoded source feature vector 532. The probability distribution may represent a likelihood that a given acoustic feature corresponds to a portion of a linguistic unit and/or the audio data representing the linguistic unit. In some embodiments, the probability distribution may be represented by a mean and a standard deviation distribution across the linguistic unit. The sample component 542 may, given the determined means and standard deviations, sample a value for each feature for each linguistic unit. The sample component 542 may determine the sampled value by determining a maximum mean probability for each value. A divergence loss component, such as a Kullback-Leibler divergence loss component, may be used to determine divergence loss corresponding to a degree of difference between different probability distributions. This divergence loss may be used during training to prevent instances in which the training process gets "stuck" on a certain training configuration and does not change despite receiving further training data.

Figure 6:
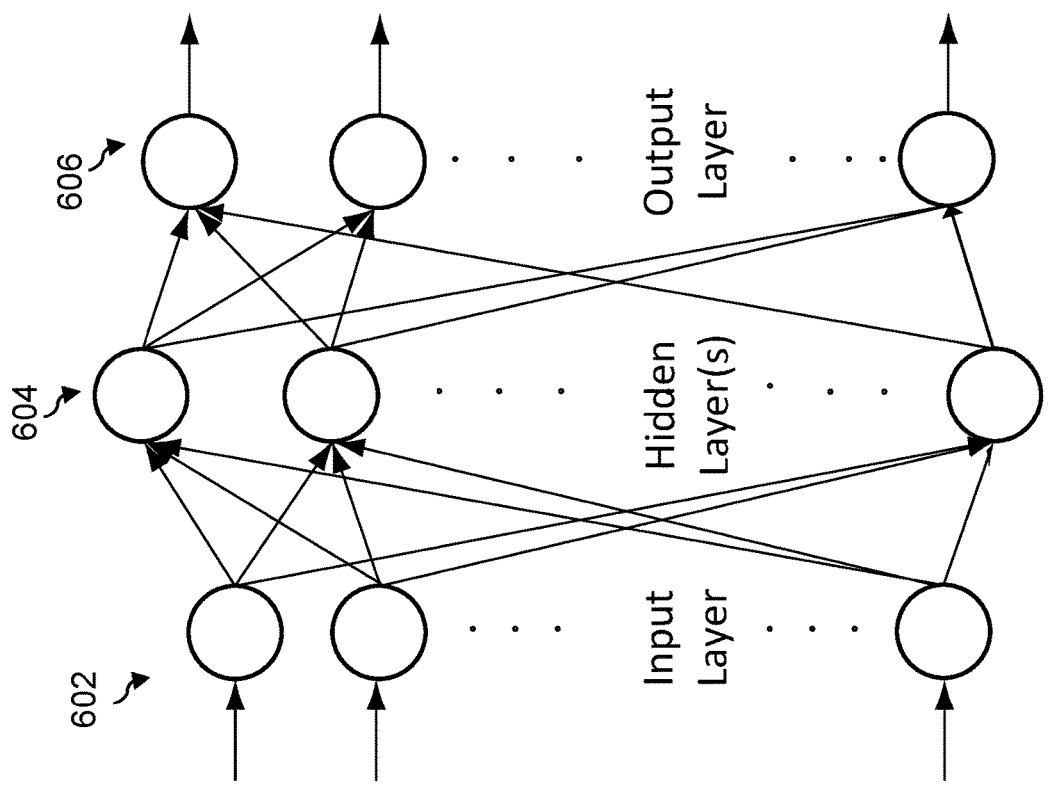
FIG. 6 illustrates a neural-network model according to embodiments of the present disclosure.

An example neural network, which may be or may be part of, for example, the encoder 504/512, attention network 506, and/or decoder 508, is illustrated in FIG. 6. The neural network may include nodes organized as an input layer 602, one or more hidden layers 604, and an output layer 606. The input layer 602 may include m nodes, the hidden layer 604 n nodes, and the output layer 606 o nodes, where m, n, and o may be any numbers and may represent the same or different numbers of nodes for each layer. Nodes of the input layer 602 may receive inputs, and nodes of the output layer 606 may produce outputs. Each node of the hidden layer 604 may be connected to one or more nodes in the input layer 602 and one or more nodes in the output layer 604. Although the neural network illustrated in FIG. 6 includes a single hidden layer 604, other neural network may include multiple middle layers 604; in these cases, each node in a hidden layer may connect to some or all nodes in neighboring hidden (or input/output) layers. Each connection from one node to another node in a neighboring layer may be associated with a weight or score. A neural network may output one or more outputs, a weighted set of possible outputs, or any combination thereof.

Figure 7:
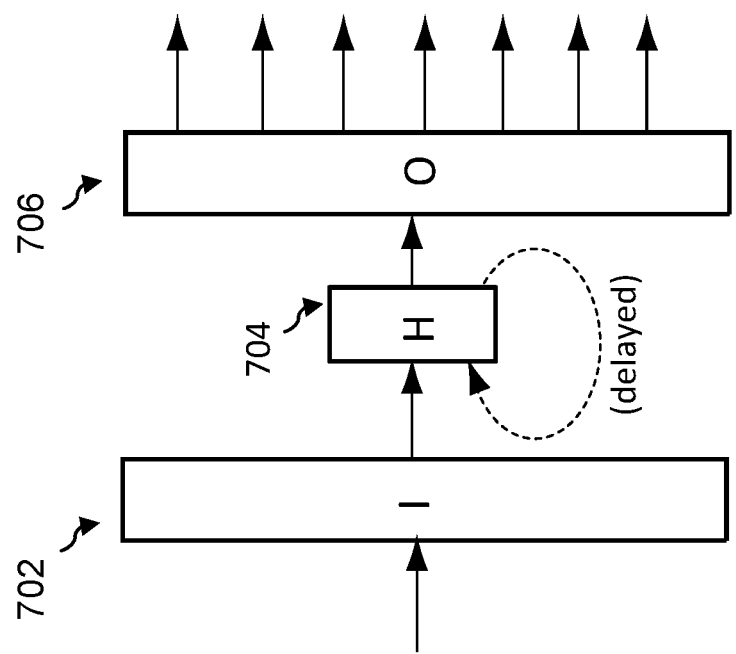
FIG. 7 illustrates a recurrent neural-network model according to embodiments of the present disclosure.

In some embodiments, a neural network is constructed using recurrent connections such that one or more outputs of the hidden layer of the network feeds back into the hidden layer again as a next set of inputs. Such a neural network is illustrated in FIG. 7. Each node of the input layer 702 connects to each node of the hidden layer 704; each node of the hidden layer 704 connects to each node of the output layer 706. As illustrated, one or more outputs of the hidden layer 704 is fed back into the hidden layer 704 for processing of the next set of inputs. A neural network incorporating recurrent connections may be referred to as a recurrent neural network (RNN); this RNN may be or may be part of, for example, the encoder 504/512 or the decoder 508.

In the case in which the speech synthesis engine 218 uses a neural network, each node of the neural network input layer may represent a previous word and each node of the output layer may represent a potential next word as determined by the trained neural network language model. As a language model may be configured as a recurrent neural network which incorporates some history of words processed by the neural network, such as the network illustrated in FIG. 7, the prediction of the potential next word may be based on previous words in an utterance and not just on the most recent word. The language model neural network may also output weighted predictions for the next word.

Processing by a neural network may be determined by the learned weights on each node input and the structure of the network. Given a particular input, the neural network determines the output one layer at a time until the output layer of the entire network is calculated. Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. In some circumstances, the neural network may be trained with an entire lattice to improve speech recognition when the entire lattice is processed.

Figure 8:
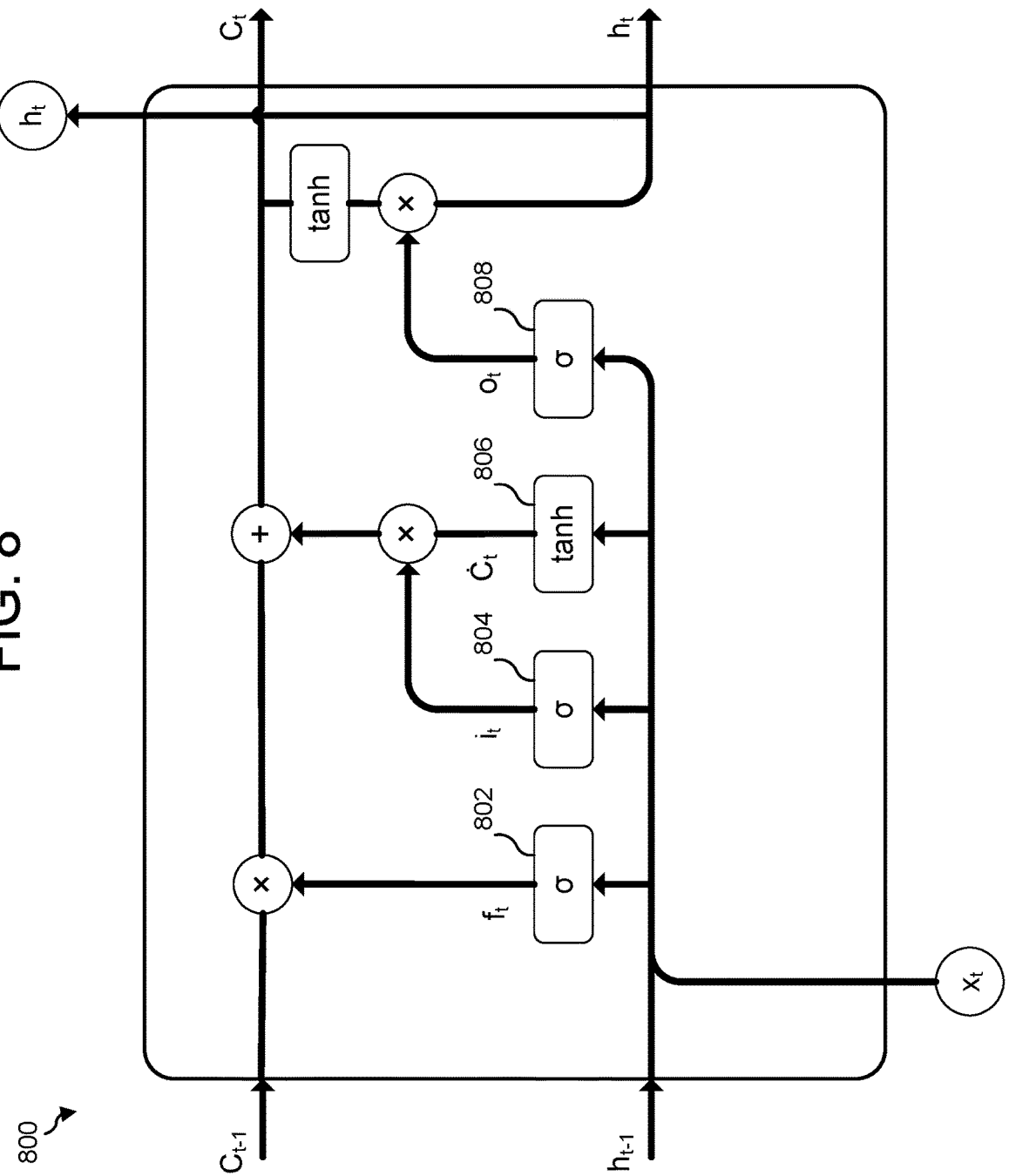
FIG. 8 illustrates a neural-network node according to embodiments of the present disclosure.

FIG. 8 illustrates an exemplary long short-term memory (LSTM) cell 800 capable of learning long-term dependencies. The LSTM cell 800 may be incorporated in, for example, the encoder 504/512 and/or the decoder 508 of FIG. 5A. Because the LSTM cell 800 is an example of a recurrent neural network, it may enable the encoder 504/512 and/or the decoder 508 to determine the context vector and/or spectrogram data 510 based not only on a current input (e.g., the source linguistic units 402$a$ . . . $n$ and/or aggregates source feature data 412) but also based at least in part on prior inputs. For example, output spectrogram data 510 corresponding to a sequence of linguistic units may vary based not only on the sequence itself, but also on other linguistic units. The LSTM cell 800 may thus enable the 504/512 and/or the decoder 508 to "learn" from previously processed linguistic units.

The LSTM cell 800 receives an input vector $x_t$ (e.g., the source linguistic units, context vector, or other vector) and generates an output vector $h_t$. The input vector $x_t$ may be, for example, the output of the CNN model 502 and may include the encoded feature vector 504 and/or the wakeword posterior 506; the output vector $h_t$ may include the wakeword detection hypothesis 406.

The cell further maintains a cell state $C_t$ that is updated given the input $x_t$, a previous cell state $C_{t-1}$, and a previous output $h_{t-1}$. Using the previous state and input, a particular cell may take as input not only new data ($x_t$) but may also consider data ($C_{t-1}$ and $h_{t-1}$) corresponding to the previous cell. The output $h_t$ and new cell state $C_t$ are created in accordance with a number of neural network operations or "layers," such as a "forget gate" layer 802, an "input gate" layer 804, a tan h layer 806, and a sigmoid layer 808.

The forget gate layer 802 may be used to remove information from the previous cell state $C_{t-1}$. For example, previously processed linguistic units may correspond to a first vocal characteristics, such as that of asking a question, while currently processed linguistic units may correspond to a second vocal characteristics, such as a statement. The forget gate layer 802 may thus be used to "forget" data corresponding to the first vocal characteristics. The forget gate layer 802 receives the input $x_t$ and the previous output $h_{t-1}$ and outputs a number between 0 and 1 for each number in the cell state $C_{t-1}$. A number closer to 1 retains more information from the corresponding number in the cell state $C_{t-1}$, while a number closer to 0 retains less information from the corresponding number in the cell state $C_{t-1}$. The output $f_t$ of the forget gate layer 802 may be defined by the below equation.

$$f_t = \sigma\{W_f \cdot [(h_{t-1}),(x_t)] + b_f\} \quad (1)$$

The input gate layer 804 and the tan h layer 806 may be used to decide what new information should be stored in the cell state $C_{t-1}$. The input gate layer 804 determines which values are to be updated by generating a vector $i_t$ of numbers between 0 and 1 for information that should not and should be updated, respectively. The tan h layer 806 creates a vector $\dot{C}_t$ of new candidate values that might be added to the cell state $C_t$. The vectors $i_t$ and $\dot{C}_t$, defined below, may thereafter be combined and added to the combination of the previous state $C_{t-1}$ and the output $f_t$ of the forget gate layer 802 to create an update to the state $C_t$.

$$i_t = \sigma\{W_i \cdot [(h_{t-1}),(x_t)] + b_i\} \quad (2)$$

$$\dot{C}_t = \tan h\{W_C \cdot [(h_{t-1}),(x_t)] + b_C\} \quad (3)$$

Once the new cell state $C_t$ is determined, the sigmoid layer 808 may be used to select which parts of the cell state $C_t$ should be combined with the input $x_t$ to create the output $h_t$. The output $o_t$ of the sigmoid layer 808 and output $h_t$ may thus be defined by the below equations. These values may be further updated by sending them again through the cell 800 and/or through additional instances of the cell 800.

$$o_t = \sigma\{W_o \cdot [(h_{t-1}),(x_t)] + b_o\} \quad (4)$$

$$h_t = o_t [\tan h(C_t)] \quad (5)$$

Figure 9:
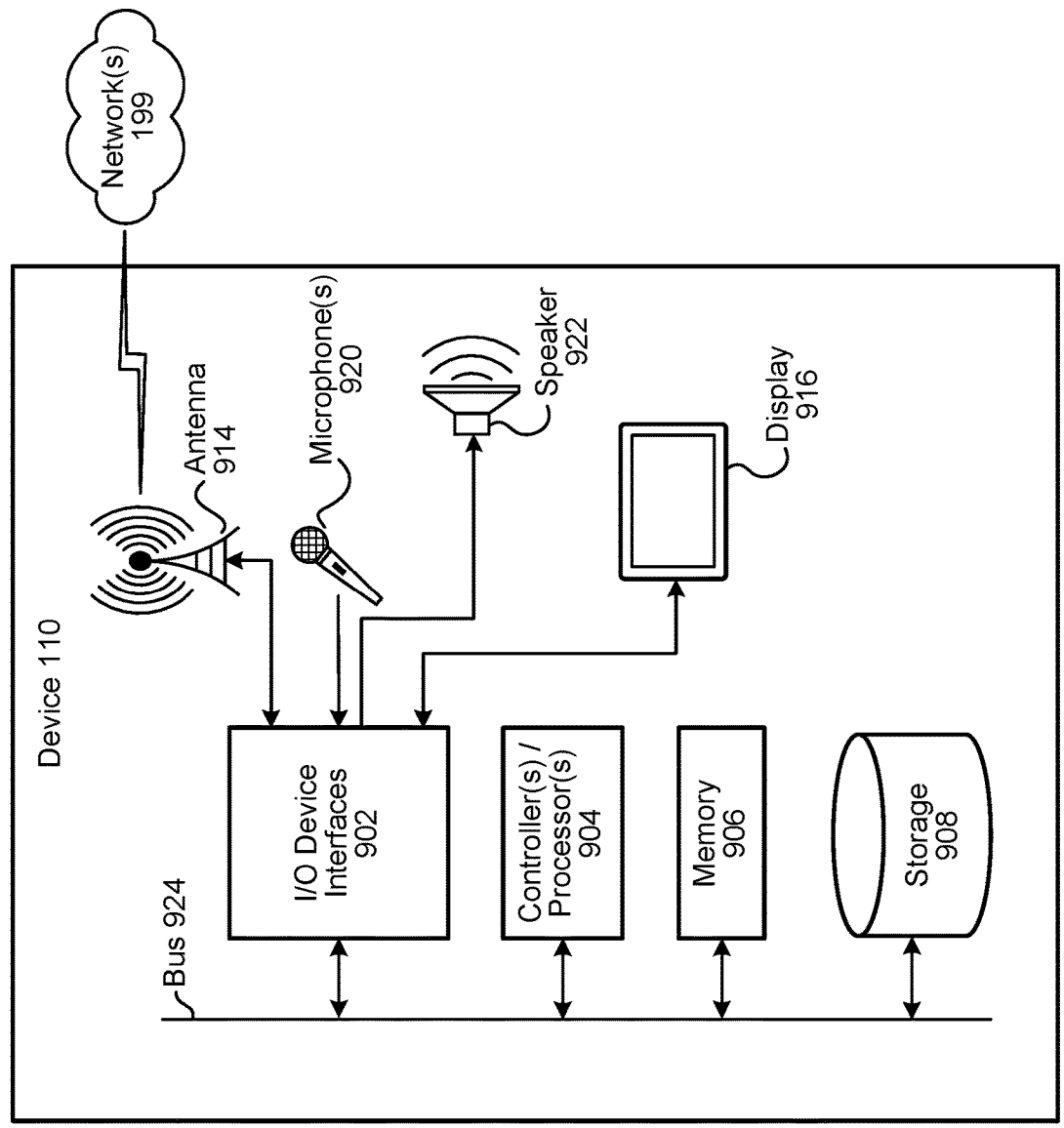
FIG. 9 illustrates components of a device according to embodiments of the present disclosure.
Figure 10:
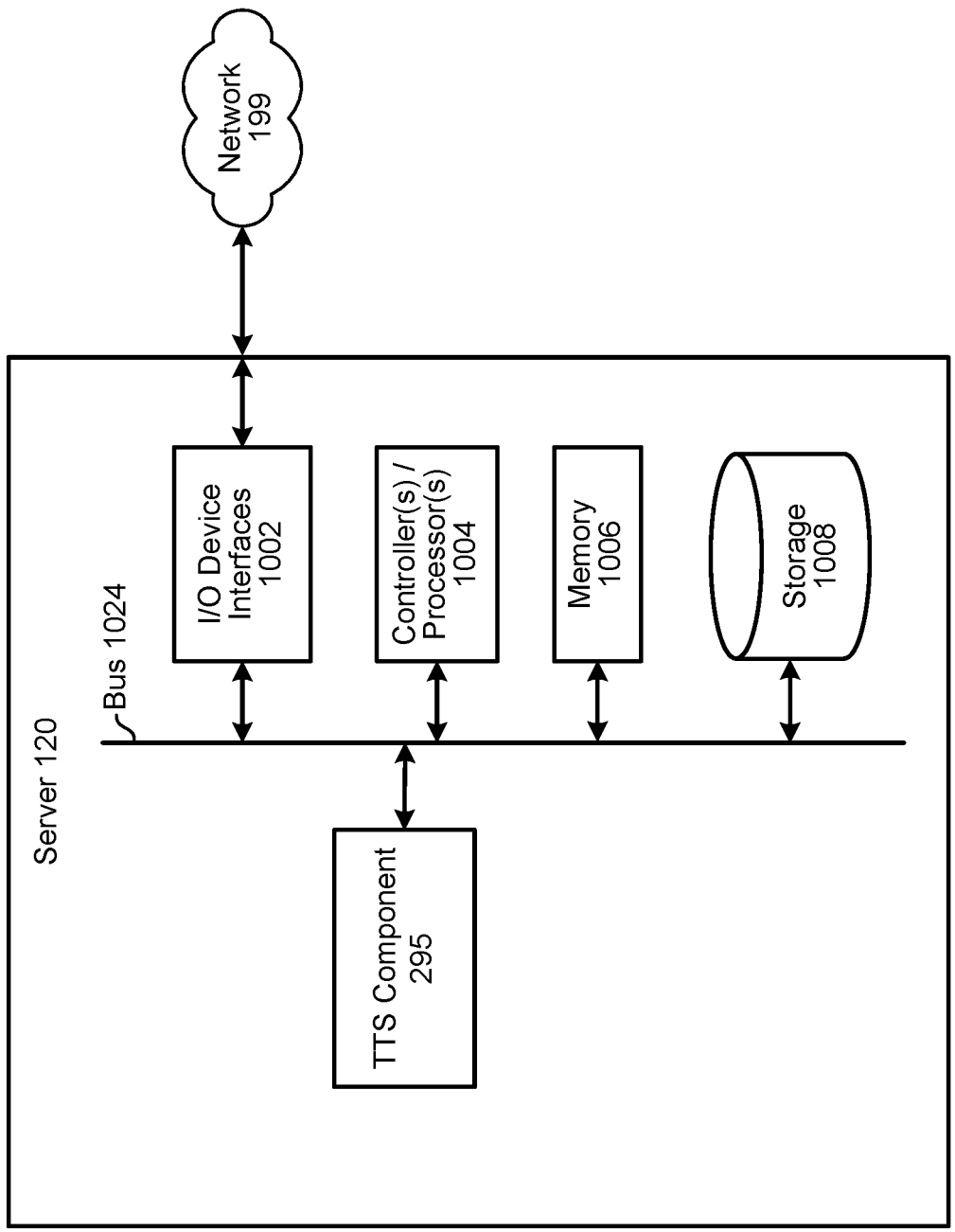
FIG. 10 illustrates components of a system such as server according to embodiments of the present disclosure.

FIG. 9 is a block diagram conceptually illustrating example components of the device 110. FIG. 10 is a block diagram conceptually illustrating example components of a remote device, such as the system 120, which may assist with TTS processing, ASR processing, NLU processing, etc. Multiple servers may be included in the system 120, such as one or more servers for performing TTS, one or more servers for performing ASR, one or more servers for performing NLU, etc. In operation, each of these devices (or groups of devices) may include computer-readable and computer-executable instructions that reside on the respective device (110/120), as discussed further below.

The device 110 and/or the system 120 may include one or more controllers/processors (904/1004), which may each include a central processing unit (CPU) for processing data and computer-readable instructions and a memory (906/1006) for storing data and instructions of the respective device. The memories (906/1006) may individually include volatile random-access memory (RAM), non-volatile read-only memory (ROM), non-volatile magnetoresistive memory (MRAM), and/or other types of memory. The device 110 and/or the system 120 may also include a data storage component (908/1008) for storing data and controller/processor-executable instructions. Each data storage component (908/1008) may individually include one or more non-volatile storage types such as magnetic storage, optical storage, solid-state storage, etc. The device 110 and/or the system 120 may also be connected to removable or external non-volatile memory and/or storage (such as a removable memory card, memory key drive, networked storage, etc.) through respective input/output device interfaces (902/1002).

Computer instructions for operating the device 110 and/or the system 120 and its various components may be executed by the respective device's controller(s)/processor(s) (904/1004), using the memory (906/1006) as temporary "working" storage at runtime. A device's computer instructions may be stored in a non-transitory manner in the memory (906/1006), storage (908/1008), or an external device(s). Alternatively, some or all of the executable instructions may be embedded in hardware or firmware on the respective device in addition to or instead of software.

The device 110 and/or the system 120 may include input/output device interfaces (902/1002). A variety of components may be connected through the input/output device interfaces (902/1002), as will be discussed further below. Additionally, each device (110/120) may include an address/data bus (924/1024) for conveying data among components of the respective device. Each component within a device (110/120) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 922, a wired headset or a wireless headset, or other component capable of outputting audio. The device 110 may also include an audio capture component. The audio capture component may be, for example, a microphone 920 or array of microphones, a wired headset or a wireless headset, etc. The device 110 may additionally include a display 916 for visually presenting content.

Via antenna(s) 914, the input/output device interfaces 902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network 199, the system may be distributed across a networked environment. The I/O device interface (902/1002) may also include communication components that allow data to be exchanged between devices such as different physical servers in a collection of servers or other components.

The components of the device 110 and the system 120 may include their own dedicated processors, memory, and/or storage. Alternatively, one or more of the components of the device 110 and the system 120 may utilize the I/O interfaces (902/1002), processor(s) (904/1004), memory (906/1006), and/or storage (908/1008) of the device 110 and system 120, respectively. Thus, the TTS component 295 may have its own I/O interface(s), processor(s), memory, and/or storage.

As noted above, multiple devices (110/120) may be employed in a single system. In such a multi-device system, each of the devices may include different components for performing different aspects of the system's processing. The multiple devices may include overlapping components. The components of the device 110 and the system 120, as described herein, are illustrative, and may be located as a stand-alone device or may be included, in whole or in part, as a component of a larger device or system.

Figure 11:
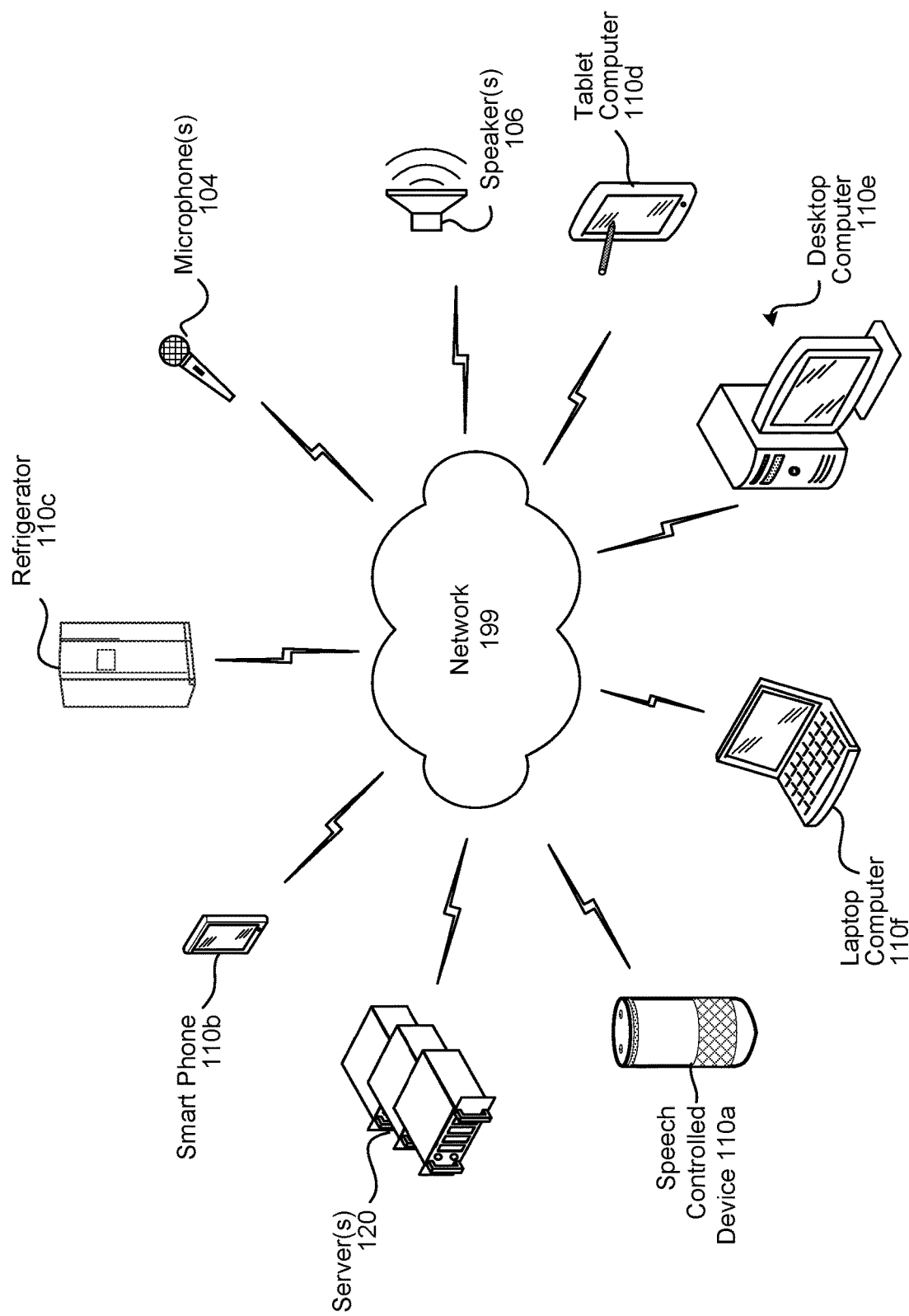
FIG. 11 illustrates a diagram conceptually illustrating distributed computing environment according to embodiments of the present disclosure.

As illustrated in FIG. 11, multiple devices (110a-110g/120/1102/1104) may contain components of the present disclosure and the devices may be connected over a network 199. The network 199 may include a local or private network or may include a wide-area network, such as the Internet. Devices may be connected to the network 199 through either wired or wireless connections. For example, a speech-controlled device 110a, a smart phone 110b, a refrigerator 110c, a tablet computer 110d, a desktop computer 110e, and/or laptop computer 110f may be connected to the network 199 through a wireless service provider, over a WiFi or cellular network connection, or the like. A microphone 1102 and a speaker 1104 may further be connected to the network 199. Other devices are included as network-connected support devices, such as the system 120, or others. The support devices may connect to the network 199 through a wired connection or wireless connection.

The concepts disclosed herein may be applied within a number of different devices and computer systems, including, for example, general-purpose computing systems, TTS systems, speech-processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for transferring vocal characteristics from a first speaker, the method comprising:
   receiving source audio data representing source speech of a source speaker;
   determining, using (a) source text data representing the source speech and (b) the source audio data, a start time and an end time of a phoneme representing at least a portion of a word in the source text data;
   determining a portion of the source audio data that begins at the start time and ends at the end time;
   determining vocal characteristic data corresponding to the portion of the source audio data;
   determining, using a linguistic encoder and the source text data, a first data vector representing an output of a final layer of the linguistic encoder, the linguistic encoder including a first neural network trained using target speech of a target speaker;
   determining, using a second neural network and the vocal characteristic data, a second data vector representing encoded vocal characteristic data;
   determining a modified first data vector by concatenating the first data vector and the second data vector; and
   determining, using a decoder and the modified first data vector, output audio data corresponding to the source text data, the output audio data representing output synthesized speech by the target speaker, wherein the output synthesized speech corresponds to the vocal characteristic data.

2. The computer-implemented method of claim 1, further comprising:
   receiving language data representing a word of the source speech, wherein the language data corresponds to a reading of an audiobook; and
   sending the language data to a text-to-speech system; and
   determining, using the text-to-speech system and the language data, the source text data,
   wherein the source text data includes a phoneme representing at least a portion of the word.

3. The computer-implemented method of claim 1, wherein determining the second data vector comprises:
   determining, using a variational autoencoder, a probability distribution representing a probability that a vocal characteristic corresponds to the portion of the source audio data, the probability distribution including a standard deviation of the probability; and
   sampling the probability distribution to determine an encoded feature of the first data vector.

4. The computer-implemented method of claim 1, further comprising:
   determining, using an orchestrator component, that the source speech corresponds to an utterance of a user;
   sending, from the orchestrator component, the source speech to an automatic speech-recognition system; and
   determining, using an acoustic model of the automatic speech-recognition system and the source audio data, the source text data, wherein the source speech corresponds to an utterance of a user.

5. A computer-implemented method comprising:
   receiving first data representing a plurality of vocal characteristics and corresponding to second data representing a first linguistic unit, the first linguistic unit representing first speech of a first speaker;
   determining, using a trained model and the second data, a first data vector representing an output of a final layer of a linguistic encoder of the trained model, the trained model based on second speech of a second speaker, wherein the first data vector corresponds to target speaker speech;
   determining, using the trained model and the first data, a second data vector representing an output of a final layer of a feature encoder of the trained model, the feature encoder being different from the linguistic encoder, wherein the second data vector corresponds to source speaker speech;
   determining a modified first data vector based at least in part on combining at least a portion of the first data vector and at least a portion of the second data vector; and
   determining, using the trained model, the modified first data vector, and the second data, audio data.

6. The computer-implemented method of claim 5, further comprising:
   determining, using second audio data and the second data, a start time and an end time of the first linguistic unit;
   determining a portion of second audio data that begins at the start time and ends at the end time; and
   processing the portion of the second audio data to determine the plurality of vocal characteristics.

7. The computer-implemented method of claim 6, further comprising:
   determining a first acoustic-unit state, the first acoustic-unit state corresponding to a first portion of the first linguistic unit;
   determining a second acoustic-unit state, the second acoustic-unit state corresponding to a second portion of the first linguistic unit;
   determining a first vocal characteristic corresponding to the first acoustic-unit state; and
   determining a second vocal characteristic corresponding to the second acoustic-unit state,
   wherein the plurality of vocal characteristics includes the first vocal characteristic and the second vocal characteristic.

8. The computer-implemented method of claim 6, further comprising:
   determining a second linguistic unit, the second linguistic unit beginning in the audio data at the end time;
   determining a third linguistic unit, the third linguistic unit ending in the audio data at the start time; and
   wherein determining the plurality of vocal characteristics is further based at least in part on processing the second linguistic unit and the third linguistic unit.

9. The computer-implemented method of claim 5, wherein determining the second data vector comprises:
   determining a probability distribution representing a probability that a vocal characteristic corresponds to the first linguistic unit; and
   sampling the probability distribution to determine an encoded feature of the first data vector.

10. The computer-implemented method of claim 5, further comprising:
    receiving text data corresponding to speech represented by the audio data; and
    determining, using an acoustic model and the text data, the first linguistic unit.

11. The computer-implemented method of claim 5, further comprising:
    receiving the audio data, the audio data corresponding to an utterance of a user; and
    determining, using an automatic speech recognition system and the audio data, the first linguistic unit.

12. The computer-implemented method of claim 5, wherein determining the modified first data vector based at least in part on combining the at least a portion of the first data vector and the at least a portion of the second data vector comprises:
concatenating the first data vector and the second data vector.

13. A system comprising:
at least one processor;
at least one memory including instructions that, when executed by the at least one processor, cause the system to:
receive first data representing a plurality of vocal characteristics and corresponding to second data representing a first linguistic unit, the first linguistic unit representing first speech of a first speaker;
determine, using a trained model and the second data, a first data vector representing an output of a final layer of a linguistic encoder of the trained model based on second speech of a second speaker, wherein the first data vector corresponds to target speaker speech;
determine, using the trained model and the first data, a second data vector representing an output of a final layer of a feature encoder of the trained model, the feature encoder being different from the linguistic encoder, wherein the second data vector corresponds to source speaker speech;
determine a modified first data vector based at least in part on combining at least a portion of the first data vector and at least a portion of the second data vector; and
determine, using the trained model, the modified first data vector, and the second data, audio data.

14. The system of claim 13, wherein the at least one memory further includes instructions that, when executed by the at least one processor, further cause the system to:
determine, using second audio data and the second data, a start time and an end time of the first linguistic unit;
determine a portion of second audio data that begins at the start time and ends at the end time; and
process the portion of the second audio data to determine the plurality of vocal characteristics.

15. The system of claim 14, wherein the at least one memory further includes instructions that, when executed by the at least one processor, further cause the system to:
determine a first acoustic-unit state, the first acoustic-unit state corresponding to a first portion of the first linguistic unit;
determine a second acoustic-unit state, the second acoustic-unit state corresponding to a second portion of the first linguistic unit;
determine a first vocal characteristic corresponding to the first acoustic-unit state; and
determine a second vocal characteristic corresponding to the second acoustic-unit state,
wherein the plurality of vocal characteristics includes the first vocal characteristic and the second vocal characteristic.

16. The system of claim 14, wherein the at least one memory further includes instructions that, when executed by the at least one processor, further cause the system to:
determine a second linguistic unit, the second linguistic unit beginning in the audio data at the end time;
determine a third linguistic unit, the third linguistic unit ending in the audio data at the start time; and
wherein determining the plurality of vocal characteristics is further based at least in art on processing the second linguistic unit and the third linguistic unit.

17. The system of claim 13, wherein the at least one memory further includes instructions that, when executed by the at least one processor, further cause the system to:
determine a probability distribution representing a probability that a vocal characteristic corresponds to the first linguistic unit; and
sample the probability distribution to determine an encoded feature of the first data vector.

18. The system of claim 13, wherein the at least one memory further includes instructions that, when executed by the at least one processor, further cause the system to:
receive text data corresponding to speech represented by the audio data; and
determine, using an acoustic model and the text data, the first linguistic unit.

19. The system of claim 13, wherein the at least one memory further includes instructions that, when executed by the at least one processor, further cause the system to:
receive the audio data, the audio data corresponding to an utterance of a user; and
determine, using an automatic speech recognition system and the audio data, the first linguistic unit.

20. The system of claim 13, wherein the instructions that, when executed by the at least one processor, cause the system to determine the modified first data vector based at least in part on combining the at least a portion of the first data vector and the at least a portion of the second data vector, further comprise:
concatenate the first data vector and the second data vector.

* * * * *